United States Patent
Reichl et al.

(10) Patent No.: US 9,664,414 B2
(45) Date of Patent: May 30, 2017

(54) DYNAMIC FLOW HEATER

(75) Inventors: Martin Reichl, St. Pantaleon (AT); Andreas Pleschinger, Schleedorf (AT)

(73) Assignee: BLECKMANN GMBH & CO. KG, Lamprechtshausen (AT)

(*) Notice: Subject to any disclaimer, the term of this patent is extended or adjusted under 35 U.S.C. 154(b) by 470 days.

(21) Appl. No.: 13/634,191

(22) PCT Filed: Jul. 12, 2011

(86) PCT No.: PCT/EP2011/003482
§ 371 (c)(1),
(2), (4) Date: Apr. 12, 2013

(87) PCT Pub. No.: WO2012/007155
PCT Pub. Date: Jan. 19, 2012

(65) Prior Publication Data
US 2013/0202279 A1    Aug. 8, 2013

(30) Foreign Application Priority Data
Jul. 12, 2010  (EP) .................................. 10007164

(51) Int. Cl.
*F24H 1/10* (2006.01)
*F28G 1/12* (2006.01)
(Continued)

(52) U.S. Cl.
CPC ............ *F24H 1/142* (2013.01); *A47J 31/542* (2013.01)

(58) Field of Classification Search
CPC . F24H 1/10; F24H 1/101; F24H 1/102; F24H 1/14; F24H 1/142; F24H 1/16;
(Continued)

(56) References Cited

U.S. PATENT DOCUMENTS 1,946,547 A * 2/1934 Russell et al. ................ 392/307
2,445,115 A 7/1948 Hanrahan
(Continued)

FOREIGN PATENT DOCUMENTS

CH         400397 A    10/1965
DE     23 40 489 A1     2/1975
(Continued)

OTHER PUBLICATIONS

Machine Translation of WO 2007/039683-A1, Feb. 2015.*
DE 42 12 074 C1 Machine Translation (Translated May 29, 2015).*
WO 2007/039683 A1 Machine Translation (Translated Feb. 2015).*

*Primary Examiner* — Quang Van
*Assistant Examiner* — Cuong P Nguyen
(74) *Attorney, Agent, or Firm* — Seed IP Law Group LLP

(57) ABSTRACT

A fluid heater of the continuous flow type, comprising a fluid channel having a first fluid channel section (35), at least one substantially cylindrical metal pipe (2), a heating device (6) preferably having two tubular heating elements (6a, 6b) spaced apart from each other over equidistant circumferential sections of the metal pipe, and heat conducting means for providing a heat-conducting connection to the metal pipe (2), wherein a fluid guiding core (30) made of plastic is disposed in the metal pipe (2) and forms the first fluid channel section (35) between the metal pipe and the fluid guiding core (30), wherein the first fluid channel section (35) runs substantially helically in the form of a groove in an outer surface of the fluid guiding core, and wherein the fluid channel has a first fluid connector for fluid supply means and a second fluid connector for fluid discharge means, wherein the fluid guiding core (30) further comprises a substantially coaxial second fluid channel section (34) disposed therein, which is connected in series to the first fluid channel section (35). In the region of a first end of the metal pipe (2), a fluid connector assembly may be provided which includes both
(Continued)

the first fluid connector (24a) and the second fluid connector (24b), such that fluid is supplied and discharged in the region of the same end faces of the metal pipe (2). A sealing plug (50) is provided in the region of the second end of the metal pipe (2).

8 Claims, 13 Drawing Sheets

(51) Int. Cl.
*F24H 1/14* (2006.01)
*A47J 31/54* (2006.01)

(58) Field of Classification Search
CPC ........ F24H 1/162; F24H 9/0005; F24H 9/001; F24H 9/0015; F24H 9/0021
USPC ............. 219/535; 392/473, 479–484; 165/95
See application file for complete search history.

(56) References Cited

U.S. PATENT DOCUMENTS

| | | | | |
|---|---|---|---|---|
| 2,513,242 | A | * | 6/1950 | Inman ............................ 219/630 |
| 2,687,626 | A | | 8/1954 | Bartlowe |
| 2,875,312 | A | | 2/1959 | Norton |
| 2,878,360 | A | * | 3/1959 | Tavender et al. ................ 239/75 |
| 2,890,318 | A | | 6/1959 | Kruse |
| 2,944,138 | A | | 7/1960 | Goff |
| 3,711,681 | A | | 1/1973 | Leuschner et al. |
| 3,718,805 | A | * | 2/1973 | Posey ............................ 392/397 |
| 4,052,590 | A | | 10/1977 | Anderl et al. |
| 4,170,901 | A | * | 10/1979 | Conkle et al. ............. 73/863.12 |
| 4,203,186 | A | * | 5/1980 | Horner .................... 29/890.045 |
| 4,395,882 | A | | 8/1983 | Kast et al. |
| 4,417,133 | A | | 11/1983 | Sanner |
| 4,460,819 | A | | 7/1984 | Eugster |
| 4,558,205 | A | | 12/1985 | Bleckmann |
| 4,563,571 | A | * | 1/1986 | Koga et al. .................... 392/493 |
| 4,693,302 | A | * | 9/1987 | Dodds .............................. 165/46 |
| 4,778,977 | A | | 10/1988 | Bleckman |
| 4,792,661 | A | | 12/1988 | Schmidtchen et al. |
| 4,825,042 | A | | 4/1989 | Häuslein |
| 4,904,845 | A | | 2/1990 | Wonka |
| 5,367,607 | A | | 11/1994 | Hufnagl et al. |
| 5,422,459 | A | | 6/1995 | Zhou |
| 5,523,550 | A | * | 6/1996 | Kimura ........................ 219/772 |
| 5,949,958 | A | * | 9/1999 | Naperkowski et al. ....... 392/399 |
| 6,098,666 | A | | 8/2000 | Wells et al. |
| 6,459,854 | B1 | * | 10/2002 | Yoakim et al. ................ 392/479 |
| 6,701,068 | B2 | | 3/2004 | Lin |
| 6,724,985 | B2 | | 4/2004 | Matsunaga et al. |
| 6,943,325 | B2 | | 9/2005 | Pittman et al. |
| 6,967,315 | B2 | * | 11/2005 | Centanni et al. ............. 219/628 |
| 7,021,372 | B2 | | 4/2006 | Pickard |
| 7,286,752 | B2 | * | 10/2007 | Gourand ........................ 392/479 |
| 7,920,779 | B2 | * | 4/2011 | Shirai et al. ................... 392/474 |
| 8,590,812 | B2 | * | 11/2013 | Wurz ............................. 239/419 |
| 2004/0057709 | A1 | | 3/2004 | Leary et al. |
| 2007/0012685 | A1 | | 1/2007 | Gourand |
| 2009/0103908 | A1 | | 4/2009 | Kono et al. |
| 2009/0154909 | A1 | * | 6/2009 | Meyer ............................ 392/473 |
| 2009/0310951 | A1 | | 12/2009 | Capraro |
| 2010/0046934 | A1 | * | 2/2010 | Johnson et al. ............... 392/480 |
| 2010/0232772 | A1 | * | 9/2010 | Chiu et al. .................... 392/441 |
| 2011/0036544 | A1 | * | 2/2011 | Shirai et al. ..................... 165/95 |
| 2011/0297360 | A1 | | 12/2011 | Perry |
| 2014/0233931 | A1 | | 8/2014 | Capraro et al. |
| 2015/0182064 | A1 | | 7/2015 | Höfer et al. |

FOREIGN PATENT DOCUMENTS

| | | | |
|---|---|---|---|
| DE | 23 56 307 A1 | | 5/1975 |
| DE | 75 36 932 U | | 5/1976 |
| DE | 77 26 863 U | | 12/1977 |
| DE | 27 43 333 A1 | | 3/1979 |
| DE | 29 03 743 A1 | | 8/1980 |
| DE | 2942523 A1 | * | 4/1981 |
| DE | 35 42 507 A1 | | 6/1987 |
| DE | 4212074 C1 | * | 4/1993 |
| DE | 4332826 A1 | | 3/1995 |
| DE | 19523047 C1 | * | 11/1996 |
| DE | 19726245 A1 | | 1/1998 |
| DE | 19852888 A1 | | 5/2000 |
| DE | 10322034 A1 | * | 12/2004 |
| DE | 102005050203 | * | 4/2007 |
| DE | 202007005738 U1 | | 7/2007 |
| DE | 60 2004 004 528 T2 | | 10/2007 |
| DE | 10 2007 034 370 A1 | | 1/2009 |
| EP | 0 303 131 A1 | | 2/1989 |
| EP | 0 445 313 A1 | | 9/1991 |
| EP | 0 485 211 A1 | | 5/1992 |
| EP | 1 321 708 A2 | | 6/2003 |
| EP | 1 076 503 B1 | | 9/2003 |
| EP | 2 044 869 A1 | | 4/2009 |
| FR | 2 855 359 A1 | | 11/2004 |
| FR | 2 891 688 A1 | | 4/2007 |
| GB | 1 494 536 | | 12/1977 |
| JP | 56116608 A | * | 9/1981 |
| WO | 2006/129511 A1 | | 12/2006 |
| WO | 2007039683 A1 | | 4/2007 |
| WO | WO 2007039683 A1 | * | 4/2007 |
| WO | 2010055472 A2 | | 5/2010 |

* cited by examiner

FIG. 6  C-C

DYNAMIC FLOW HEATER

FIELD OF THE INVENTION

The invention relates in general to fluid heaters, in particular to continuous-flow heaters for household appliances. More specifically, the invention relates to a particularly compact fluid heater with a high heating capacity and small dimensions.

BACKGROUND

Many designs and types of fluid heaters for producing hot fluids, in particular hot water or steam, are known from the prior art. Household appliances in which fluid heaters are used include steam cleaners, steam irons, as well as appliances for preparing meals and/or hot beverages, such as coffee machines, espresso machines, milk frothers, steam cookers and others.

What matters to some degree at least for such appliances is that a fluid heater which uses electric energy to generate a hot fluid or steam from a cold fluid be integrated in what is already a compact device, i.e. one that has limited interior space. The fluid conduits must also withstand pressures of several atmospheres, particularly when steam is produced.

EP 1 321 708 shows a fluid heater for making hot water or steam, comprising a fluid conduit and a heating device, the heating device consisting of at least two tubular heating elements connected in a heat-conducting manner to the fluid-conducting pipe. In order to increase the area of contact between the heating device and the fluid-conducting pipe, the fluid-conducting pipe and the tubular heating element are provided with matching contact surfaces such that either the tubular heating elements have substantially convex contact surfaces and the fluid-conducting pipe has substantially concave contact surfaces to match, or both the tubular heating element and the fluid-conducting pipe have substantially planar contact surfaces. Like many other devices known from the prior art, it is also proposed that the components consisting of a fluid-conducting pipe and a heating device be produced in the form of an extrusion profile, with the intended geometry of contact surfaces being formed between the fluid-conducting pipe and the tubular heating elements.

A common feature of prior art devices, with regard to obtaining high heating capacities in a confined space, is that a maximum proportion of the fluid guiding pipe is in good heat-conducting contact with the heating device. Until now, round cross-sections for the fluid conduits guiding core have given rise to the problem that the ratio between the heated interface and the fluid volume in the fluid conduit is too large and that a cold core flow ensues. This requires relatively long fluid conduits for inputting the thermal energy needed for the desired fluid temperature. In the case of the prior art discussed above, the fluid guiding pipe, which has a circular cross-section in its original state, is deformed during manufacture in order to reduce the cross-section that is heated during operation. This requires a respective deformation step during manufacture.

BRIEF SUMMARY

One potential object of the invention may therefore be considered that of improving a fluid heater, with regard to the amount of space it requires and with regard to heat transfer and temperature control, in order to provide a particularly compact fluid heater. A further or alternative potential object of the invention may be considered that of improving the dynamic behavior of a generic fluid heater in respect of its control system in such a way that its idle time or time constant is minimized by the control system.

This object is achieved with a fluid heater according to claim 1. Advantageous embodiments and developments of the invention are specified in the dependent claims that follow.

The metal tube is preferably of stainless steel. Stainless steel basically has the clear advantage that there are no doubts concerning its use in the food industry. Although stainless steel has a thermal conductivity that is significantly worse than that of aluminum, for example, it is precisely this property that is advantageous in the fluid heater according to the invention, as shall be made clear in the following.

According to the invention, a fluid guiding core preferably made of a plastic material is provided in the metal pipe and embodied in such a way that the hydraulic length of the heated fluid channel inside the metal pipe is substantially increased in relation to the length of the metal pipe. To this end, the fluid guiding core has a helical circumferential groove, the bottom and sides of which form, in co-operation with the inner surface of the metal pipe, a first fluid channel section for guiding the fluid, through which the fluid to be heated can flow or be guided. Compared to the free cross-section of the metal pipe by itself, the first fluid channel section embodied in this way has a cross-section which is reduced by a multiple factor, yet its hydraulic length is significantly longer than the metal pipe. The reduced cross-sectional area compared to that of the metal pipe results in a smaller fluid mass to be heated per unit of length. In addition, the helical fluid conduit substantially increases the amount of time that the fluid to be heated spends on the heated inner surface of the metal pipe, thus allowing the fluid to be heated more intensively and uniformly by the inventive fluid heater.

Whereas plastic is a possible material for the fluid guiding core, especially for cost reasons, it is also possible as a basic principle to use metal, stone, clay, ceramics or similar materials that can be brought into the shape described in the foregoing, in particular food-safe and heat resistant materials.

The heat capacity of the fluid heater can be significantly reduced, in that the fluid heater can be substantially reduced in length by the inventive fluid guiding core and because other materials besides metal can be used for the fluid guiding core. This allows the dynamic behavior of the fluid heater to be significantly improved in respect of its control technology and for a continuous-flow heater to be provided that addresses the stated problem and which has a minimized idle time and/or time constants, and which therefore has particularly favorable temperature control characteristics.

Whereas the helical shape has proved to be advantageous for the first fluid channel section formed by the fluid guiding core, especially in terms of fluidic properties, other shapes for the fluid channel, such as a shape which meanders in the longitudinal direction of the fluid guiding core or also in the transversal direction of the fluid guiding core, are also conceivable and producible.

Known tubular heating elements made of aluminum, which are preferably disposed parallel to and on the metal pipe, are suitable as heating devices. In one particularly preferred embodiment, at least two tubular heating elements lying opposite each other relative to the metal pipe are provided as a heating device, in order to input with minimal loss the heat generated electrically in the tubular heating elements into the metal pipe and subsequently into the fluid.

The surfaces of the tubular heating elements are preferably concave in shape to match the surface of the substantially cylindrical metal pipe.

It should be noted with regard to the heating device and the tubular heating elements surrounded by said device that more than two tubular heating elements may of course be provided. Although an equidistant arrangement of the tubular heating elements in the circumferential direction is one possibility, especially for efficient and uniform conduction of heat, an alternative arrangement may be advisable for production technology or constructional reasons, and all of these arrangements are within the scope of the present invention.

A solder joint that conducts heat well is preferably used as a heat-conducting connection between the heating device, for example the tubular heating elements, and the metal pipe. In particularly preferred embodiments, especially in the case of a thin-walled metal pipe made of stainless steel, the heating device additionally includes a heat conducting means, for example a heat conducting metal plate disposed like a collar or sleeve around the metal pipe, which distributes the heat over the entire circumference of the metal pipe covered by the heat conducting means, in addition to the improvement in heat conduction achieved at the contact surfaces between the heating device and the metal pipe by the soldered joint. The heat conducting means is preferably made of a material with good heat-conducting properties, such as copper, aluminum, alloys of said metals, or the like.

The heat conducting means may also surround the entire circumference of the metal pipe or may also have holes therethrough in order to ensure that fluxing agents can pass through when soldering is being carried out.

According to the invention, the heat conducting means compensates for the poor thermal conductivity of the stainless steel pipe by quickly distributing the heat from the at least two tubular heating elements around the stainless steel pipe, such that the stainless steel pipe can be heated over its entire circumference. In this way, the distribution of heat in the metal pipe can be controlled by the shape of the heat conducting means, by means of the metal pipe made of a material with poor heat-conducting properties, such as stainless steel, and the heat conducting means made of a material with good heat-conducting properties, such as aluminum or copper or an alloy thereof. It should be noted at this point that the dimensioning of the heat conducting means in the axial direction, i.e. in the longitudinal direction, of the metal pipe plays a particularly important role and has a protective function, especially when malfunctions occur, and specifically with regard to the sealing plug, end cap and fluid connector assembly that will be discussed later.

In preferred embodiments, at least one tubular heating element is embodied as a high-performance tubular heating element. "High-performance tubular heating elements" are understood here to mean any kind of tubular heating element designed to convert high levels of electric power into heat. Such a high-performance tubular heating element may have a "double coil" which is embedded in an electrically insulating material that conducts heat well, for example compacted magnesium oxide. In contrast to conventional tubular heating elements, the heating coil diameters of the high-performance tubular heating elements are high in relation to the inner diameter of the jacket pipe, so it is possible for higher levels of electrical power to be emitted as heat, due to a reduced heat conduction path between the heating coils and the outside of the jacket pipe.

The inside diameter of the tubular heating elements is preferably 8 mm. The outer diameters are preferably in the range from 10 mm to 12 mm, and a heating capacity of 25 watt/cm$^2$ to 30 watt/cm$^2$ is made possible for the length of the heated part of the jacket pipe. Capacities of 35 to 45 W/cm$^2$ are reached on the contact surface with the metal pipe or heat conducting means.

The connecting ends of the tubular heating element may be offset away from the surface of the metal pipe to achieve better contact, and may have "cold" ends in this connecting region. The heating coil is preferably conical in shape in the region of the offset, and transitions from a larger diameter in the heating region to a smaller diameter in the connection region. This counteracts negative impacts of the offset on the central position of the heating coil inside the tubular heating element, and relieves the amount of strain and avoids any local reduction in cross-section.

Depending on the dimensioning of the side wall and the width of the first fluid channel section around the fluid guiding core, it is possible to achieve pitches that allow the hydraulic length of the fluid channel to be doubled or trebled in relation to the length of the metal pipe. This relationship is shown particularly lucidly when serpentines oriented longitudinally in respect of the fluid guiding core are provided, the single linear sections of which (aside from the arcuate sections connecting them) have almost the entire length of the metal pipe in which the fluid guiding core is located. This results in a stepwise increase in the fluid temperature in the circumferential direction of the metal pipe, in contrast to the preferred embodiment as a helix, in which the increase in fluid temperature occurs in the longitudinal direction.

In this way, when tubular heating elements are arranged non-uniformly on the circumference of the metal pipe and when a serpentine fluid channel is used in the fluid guiding core, it is possible, by arranging fluid inlets and outlets appropriately in the circumferential direction relative to the tubular heating elements, to systematically influence the temperature conditions, in particular the temperature gradient between the heating device and the fluid guiding core.

In one development of the invention, the metal pipe and the heating device, i.e. the heating elements and any heat conducting means present, are clasped by a mounting bracket. The mounting bracket may be produced from a punched metal part and have clip-like structures by means of which the heating device can be secured, or positioned, on the metal pipe or on the heat conducting means before they are soldered, preferably collectively. The mounting bracket is preferably made of the same material as the heat conducting means, although it may also be made of some other material. The conduction of heat from the clips clasping the heating device to the surface of the metal pipe, or to the heat conducting means, is favored by the clips contacting the metal pipe and/or the heat conducting means as part of the mounting bracket. The mounting bracket preferably has two clip sections, wherein a substantially planar mounting section of the mounting bracket lies between said two sections and abuts the cylindrical external face of the metal pipe or heat conducting means in a non-planar manner.

The mounting section is preferably used, inter alia, to mount a protective device, preferably a twin fuse, which serves as an electrical connector for electrical connection leads of the at least two tubular heating elements and which interrupts the cable path leading to and from them when a maximum temperature is exceeded, and to mount a temperature sensor, preferably an NTC sensor.

The mounting section does not contact the heating device or heat conducting means or metal pipe over its entire surface. If the mounting section is substantially planar, it may have substantially linear sections in contact with the cylindrical surface sections of the heating elements and the heat conducting means. In this way, the mounting bracket provides the respective sections in just one component, on the one hand for the advantageous conduction of heat in sections between the tubular heating elements or metal pipe and the protective device (e.g. twin fuse) and the temperature sensor (e.g. NTC sensor), on the other hand for the advantageous planar geometry, likewise in sections, for mechanically fixing an electrical connection.

As noted in the foregoing, the mounting section is a planar support surface for an NTC sensor, for example, or for a twin fuse. The lateral conduction of heat by the heat conducting means or by the clips which likewise conduct heat well is sufficient for an NTC sensor or twin fuse to measure or "feel" the temperature of the heating device.

Through holes, tabs, recesses and other structural features suitable for attaching the components may additionally be provided on the mounting bracket, not only for mounting electrical devices on the mounting bracket, but also for fixing the fluid heater as a component inside a household appliance of the kind initially specified.

As noted above, the connections of the electric protective device serve simultaneously as connection points for the connection leads for connecting the tubular heating elements to a source of electrical current. However, an electrical connection device may also be provided as an advantageous development of the invention on the mounting section, said device being adapted to spatially consolidate leads for different electrical signals received at or applied to the fluid heater and to supply these signals to the periphery, in particular to a controller of the fluid heater, or to forward them from the periphery to the fluid heater. Particularly preferred embodiments of the electrical connection means include, for example, flat plugs which are contacted in a mechanically and electrically reliable manner by respective plug connectors provided on the supply line side, such as terminal members or other plug members containing the flat plugs of the electrical connection device. A group plug may also comprise, as an electrical connection device, the power supply lines for the electrical tubular heating elements, for the earthing contact(s) and signal leads for connecting the temperature sensors and the safety temperature sensor.

In order to prevent any damage to the plastic parts being used, it is recommended that the plastic parts being used are designed to be appropriately temperature resistant, especially if there is potential contact with component sections (of the heating device, for example) that are exposed to intense thermal loads. One potential material for insulating the electrical leads and which has the necessary temperature stability is silicone, for example.

Additional portions for mechanical attachment of the fluid heater in a household appliance may be provided on the mounting section for attaching the electrical connector assembly. These sections draw additional thermal energy from the mounting section for attaching the electrical connection device and radiate that energy into the surroundings. This also reduces the level of thermal stability and dimensional stability to be met by that structure of the household appliance on which the assembly is to be mounted.

At a first end of the metal pipe of the fluid heater according to the invention, a first fluid connector assembly having at least one first fluid connector for fluid supply means may be provided. The purpose of the fluid connector assembly is to mediate between the different cross-sections of the fluid supply means and of the metal pipe in a pressure-tight and fluid-tight manner. A fluid guiding means may be inserted at the first fluid connector of the fluid connector assembly and may be attached to the latter by means of known detent connections, for example. The fluid connector assembly conducts the fluid fed to it into the metal pipe, the one open end of which it hermetically seals for this purpose (as seen from the free cross-section of the first fluid connector). In order to withstand any fluid pressure prevailing in the metal pipe, a particularly resilient connection must be provided between the metal pipe and the fluid connector assembly.

This connection may be produced, for example, by one part of the fluid connector assembly, particularly one having a circumferential seal, being inserted into one end of the metal pipe, and the overlapping rim of the metal pipe being plastically deformed in such a way, for example by compression or folding, that the pipe rim undercuts a circumferential web on the fluid connector assembly.

Alternatively, a part of the fluid connector assembly may be fitted externally onto the metal pipe, i.e., may surround the metal pipe like a sleeve or bushing and be sealed against the metal pipe with a seal.

At the end of the metal pipe opposite the first fluid connector assembly, a second fluid connector assembly may be provided which then has a structure which is preferably identical to that of the first fluid connector assembly. The second fluid connector assembly can be attached in a manner substantially identical to the way in which the first fluid connector assembly is attached. Both fluid connectors, in particular the fluid connector for fluid discharge, may have substantially circular disk-shaped free cross-sections for guiding fluid, the advantages of which shall be discussed further below.

In one particular development of the invention, a second fluid channel section for guiding the fluid is provided inside the fluid guiding core. The second fluid channel section may be of substantially cylindrical shape. It is preferred that the second fluid channel section be connected to the first fluid channel section via a respective hole or duct in the fluid guiding core, i.e., that they be connected in series. The fluid to be heated flows firstly through one of the two channels before subsequently flowing through the respective other fluid channel section. Such a one-sided arrangement of both fluid supply and also fluid discharge may be specifically advantageous with regard to assembly and/or production steps and to the amount of space required in the household appliance (e.g. in the coffee machine).

In one preferred embodiment, the fluid to be heated flows firstly through the interior of the fluid guiding core (the first fluid channel section), is then conducted in a substantially radial direction by means of the duct in the fluid guiding core to the outer side of the fluid guiding core, in order to flow through the second fluid channel section in contact with the heated inner surface of the metal pipe and thus be heated to the desired temperature.

In the case of a helical second fluid channel section on the outer side of the fluid guiding core, it is possible with this embodiment for fluid discharge to be on the same side as the side on which fluid is supplied. In the case of a serpentine fluid channel, the side on which fluid is supplied depends on the direction in which fluid flows through the last turn of the serpentine, which means that it is technically feasible for either side to be used for fluid supply, as a basic principle, even when the outer fluid channel section is a serpentine.

Using the fluid connector assembly according to the invention obviates the need for a through hole in the metal pipe in order to supply or discharge the fluid. Some form of metalworking—such as the folding described above—may be necessary, but only to attach the respective connector assembly to the ends of the metal pipe. Weakened sections and other measures to seal the pressure vessel further may therefore be omitted. Furthermore, this structure results almost automatically in a very compact design for the continuous-flow heater, since the metal pipe need be only slightly longer than its heated portion.

With regard to the temperature stability of the fluid connector assembly preferably made of plastic material, heat conducting paths inside the fluid heater may be dimensioned in such a way, by dimensioning the heat conducting means on the metal pipe, that, particularly in the case of overheating, temperature sensors or safety temperature limiters provided to protect the fluid heater are activated before the stability limit of the respective fluid connector assembly and/or of its connection to the metal pipe is reached. The ends of the metal pipe may be decoupled from the heat supply, for example, by providing the heat conducting means at a suitable distance from the fluid connector assembly on the metal pipe.

According to one particularly preferred embodiment, the fluid connector assembly, or the fluid connector assemblies when the fluid supply and fluid discharge are disposed on one side at the other end from the sealing plugs, is/are connected interlockingly by an undercut to the respective connector assembly by means of a fold in the respective closing edge or abutting edge of the metal pipe. When under a pressure load, the respective elements are thus supported from the inside by the respective fold.

A "fold" in this context is understood to be a plastic forming of the metal pipe in order to form the undercut, for example by reducing the diameter of the metal pipe end. It should be noted that the fold need not extend all the way around the end of the metal pipe; it is been discovered, rather, that it suffices if a portion of the closing edge of the metal pipe is folded. A sealing means which is surrounded by the metal pipe is preferably provided between the connector assembly and the metal pipe.

In one advantageous development of the invention, the groove disposed on the outer side of the fluid guiding core changes in depth in the direction of flow or in the direction of fluid discharge, that is to say, the first fluid channel section increases in depth, at least in one section, and/or decreases in width. Although the flow velocity in the fluid channel is reduced by a continuous or section-by-section increase in depth, the fluid channel being no longer in the contact region of the heating device towards the end, protection against clogging with limescale results from the increase in the cross-section of flow. Since fluid discharge in the radial direction may be made possible via the second fluid connector formed perpendicular to the fluid guiding core, the increase in depth in the first fluid channel section offers fluid-mechanical advantages with regard to deflection of the fluid flow. For example, it is possible to reduce fluid friction losses in the end portion of the fluid channel, where the flow in a direction parallel to the length of the fluid guiding core is deflected into a radial direction, since the average radius of deflection increases, as a result of which unwanted flow noises are also reduced.

It is well known that the temperature increase, which is intentional in generic devices disposed between the fluid supply and fluid discharge, is also accompanied by an increase in the volume of fluid. In other words, the same fluid mass under consideration occupies a smaller volume in the inlet region, where its temperature has essentially not been increased as yet, than in the region of the fluid outlet. A substantially constant fluid channel section thus results, for thermodynamic reasons alone, in the fluid having an increasing flow velocity as it advances in the direction of flow, which advantageously counteracts any deposition of limescale in the heated region. When the fluid then leaves the region of the fluid channel which is directly heated, however, deposition of limescale is less probable, which is why it is possible to do without high velocities in favor of reduced risk of clogging and reduced loss of flow, which may be specifically manifested in the form of cavitation and flow-induced noise.

The object of the present invention is also solved by an inventive fluid connector assembly according to claim 14. Advantageous embodiments and developments of the invention are specified in the dependent claims that follow.

The fluid connector assembly according to the invention may be provided in a fluid heater according to the invention, in particular in any one of the embodiments described above. The fluid connector assembly according to the invention may also be advantageously made from plastic elements in order to simplify production and also to reduce costs and weight.

The first and the second fluid connector are used to attach fluid guiding means, which in many cases are in the form of respective tubes, pipes or similar. Accordingly, the fluid connectors may be embodied as pipe connectors, on the outer side of which ribbing, rims, grooves or the like may be provided for securely attaching the fluid guiding means. At their ends, the fluid guiding means may also have plug assemblies with snap-in or locking members.

For the pressurized fluid guiding means and connections, pressure-resistant connections are proposed in which release of the components from each other is prevented by splint pins which engage form-lockingly on the rear side. Such a device will be discussed in more detail below with reference to the Figures.

If the fluid is supplied via a second fluid channel section disposed inside the fluid guiding core, the first fluid connector may be provided as an integral part of the fluid guiding core for further reduction of the number and diversity of parts. In order to integrate the second fluid connector, a structure like a sleeve or bushing may be provided, similar to a hinge arrangement, around the region of the fluid guiding core which is adjacent to the first fluid connector, i.e., around that part which is located in an unheated portion of the fluid heater, said sleeve- or bushing-like structure being sealed on its inner side against the first fluid connector for the fluid supply and connected fluid-tightly to the metal pipe on the outer side opposite the first fluid connector. The second fluid connector for fluid discharge may be provided at the bushing or sleeve as an integral component, and may be molded onto the bushing or sleeve.

It is particularly advantageous when the two components of the integral fluid connector assembly to be sealed against each other are produced as integral injection-molded parts. During assembly, i.e. during pre-assembly, the sleeve- or bushing-like structure with the second fluid connector is pushed onto the first fluid connector and the fluid guiding core and preferably connected thereto by means of a form-locking connection mechanism. This can be done advantageously with a bayonet connection or with a single-start screw connection. It is important in this regard that the two components be positioned relative to each other in a targeted, i.e. exact, manner. The latter is specifically important because the fluid channel formed on the outer side of the fluid guiding core must be disposed with its end portion arranged relative to the bushing or sleeve in such a way that the end of the fluid channel can communicate free of congestion with the second fluid connector.

It is essential for a fluid-mechanically favorable transition between the helical fluid channel on the fluid guiding core and the free cross-section of the second fluid to connect both channels to each other with as large a free cross-section as possible, and that there is no baffle edge or blocking edge that might obstruct the fluid in the direction of flow. It is therefore advantageous to provide the free cross-section defined by the fluid channel end in the fluid guiding core almost completely as a free cross-section in the second fluid connector also. Fluid-mechanical losses, cavitation and undesired noise can be effectively reduced or prevented in this way.

The circumferential sealing means on the fluid guiding core and on the first fluid connector may consist, for example, of NBR (nitrile butadiene rubber), LSR (liquid silicone rubber), FFKM (perfluoronated elastomer), a high-performance fluoroelastomer, EPDM (ethylene propylene diene monomer), FKM (fluorocarbon) or a TPE (thermoplastic elastomer). Appropriate materials may also used for the seal between the fluid connector assembly and the metal pipe.

In one particularly advantageous embodiment, the fluid heater has a fluid guiding core with at least one substantially frusto-conical end which is preferably disposed at the fluid-discharging end of the fluid guiding core and which has a fluid channel end portion embodied in the form of a substantially kinkless continuation of the first helical fluid channel section and which opens out at the front face of the frusto-conical end. Furthermore, at least one of the fluid connectors of the fluid heater has a substantially funnel-shaped opening into which the frusto-conical end of the fluid guiding core is sunk, and a fluid connector which is connected to the funnel-shaped opening and leads to a connection piece for a fluid supply means or fluid discharge means, wherein the transition between the funnel-shaped opening and the fluid connector is preferably rounded.

In one advantageous development of the invention, the cross-section of flow may be substantially constant from the end of the first fluid channel section to the orifice of the fluid channel end section in the front face of the frusto-conical end. The flow cross-section at the orifice of the fluid channel end portion may also be substantially equal to the flow cross-section of the fluid connector channel.

This results in a continuous fluid channel of substantially constant cross-section as far as the connection piece of the fluid connector. Such an embodiment of the fluid channel, particularly on the hot discharge side as far as the frusto-conical end of the fluid guiding core, results in a fluid guiding core with as constant a cross-section as possible and without any abrupt changes of direction, so that there are effectively no edges, kinks or baffle surfaces to counteract the flow of fluid. This prevents flakes of limescale from being deposited at such places, which can otherwise result in gradual clogging of the fluid channel. Such flakes of limescale are caused by depositions of lime scale in the region of the heated surfaces of the fluid heater, which initially accumulate there and break off again and again as flakes which are carried away by the fluid flow. These flakes of limescale carried by the flow of fluid are rinsed out better, in the fluid conduit according to the invention, and fluid-mechanical losses and noise caused by preventing or reducing flow velocity changes and cavitation flow velocity are favorably influenced. Due to the reduced susceptibility to limescale and to the more uniform flow conditions, the temperature control and the dynamic behavior of the fluid heater are also improved.

In another advantageous development of the fluid heater, the helical first fluid channel section is embodied in the form of a groove in the outer surface of the fluid guiding core, and, in the cross-section of the groove, the transition between a groove floor and the substantially parallel groove side walls is rounded and preferably arcuate, so that the groove side walls transition substantially kinklessly into the floor of the groove. Alternatively, the groove floor may also be curved and preferably arcuate, and may transition substantially kinklessly into substantially parallel groove side walls. It is preferred that the cross-sectional shape of the first fluid channel section can continue substantially unchanged in the fluid channel end portion. This configuration of the cross-sectional shape of the fluid channel supports the aforementioned, advantageous rinsing of limescale flakes and prevents their being deposited at places of lower flow velocity that are formed, in particular, in the corners of an angular cross-sectional profile.

In another embodiment, the fluid heater has a fluid guiding core comprising a cylindrical core and a helix disposed thereon, which forms a fluid guiding channel section running helically around the fluid guiding core, wherein the core has at least one substantially conical end which projects into a substantially funnel-shaped opening of a fluid connector. The diameter of the core is preferably smaller than the diameter of the orifice of the funnel-shaped opening on the end face of the fluid connector. In one development of the fluid heater, the apex angle of the conical end of the core can be selected so that a substantially constant flow cross-section results in the funnel-shaped opening from the orifice to a transition to a fluid connector channel. In this embodiment also, less abrupt changes of direction and obstacles for fluid flow arise, especially on the hot fluid discharge side of the fluid heater, with the concomitant, aforementioned advantages regarding flow resistance, noise and depositing of limescale, which also has advantageous effects on service life, temperature control and dynamic behavior.

The fluid guiding core, which consists or a core and a spiral, can also be produced and installed in a particular simple and cost-efficient manner. The core of the fluid guiding core may be made of plastic. The helix of the fluid guiding core may be made of plastic or of metal, preferably of steel, wherein it may be flexible and be simply pushed onto the core, for example. Thus, the flexible helix can move to a certain degree on the core in the fully assembled fluid heater, or it may be fixed in place between the two fluid connectors with slight pressure from both sides in the axial direction. In this case, the core of the fluid guiding core is preferably connected fixedly to the other fluid connector, preferably to fluid supply connection, and projects with its conical end into the funnel-shaped opening of the opposite fluid connector, preferably of the fluid discharge connection, with touching the latter. This arrangement makes it particularly simple to install the fluid guiding core in the fluid heater. Alternatively, the fluid guiding core of this embodiment, comprising a core and a helix, may also be made in a single piece from a plastic, preferably from an elastomer.

BRIEF DESCRIPTION OF THE FIGURES IN THE DRAWINGS

The aforementioned embodiments and features of the invention, as well as other advantageous configurations and developments, shall now be described with reference to drawings. The expressions "left", "right", "top", and/or "bottom" used within the description relate to the respective Figure in such a way that the reference signs and names of the Figures can be read normally. The Figures show the following:

Figure 14:
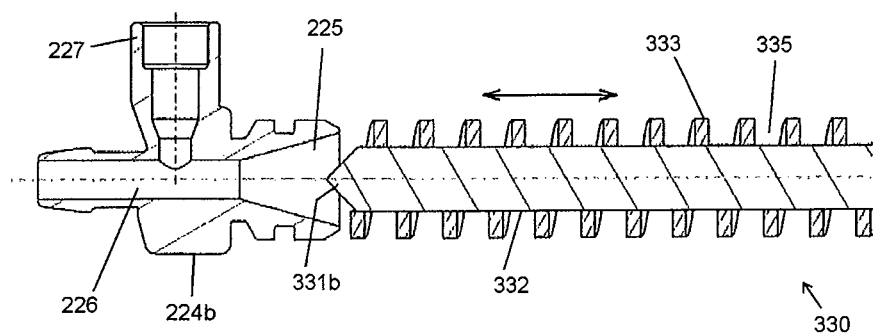

FIG. 14 shows a partial cross-sectional view of another embodiment of a fluid heater according to the invention, showing one end of a two-part fluid guiding core having a core and a flexible helix placed thereon and an associated fluid connector; and FIGS. 15-19 show views of a combination of fluid guiding core and associated fluid connectors according to further embodiments of the inventive fluid heater.

DETAILED DESCRIPTION OF THE DRAWINGS

Figure 1:
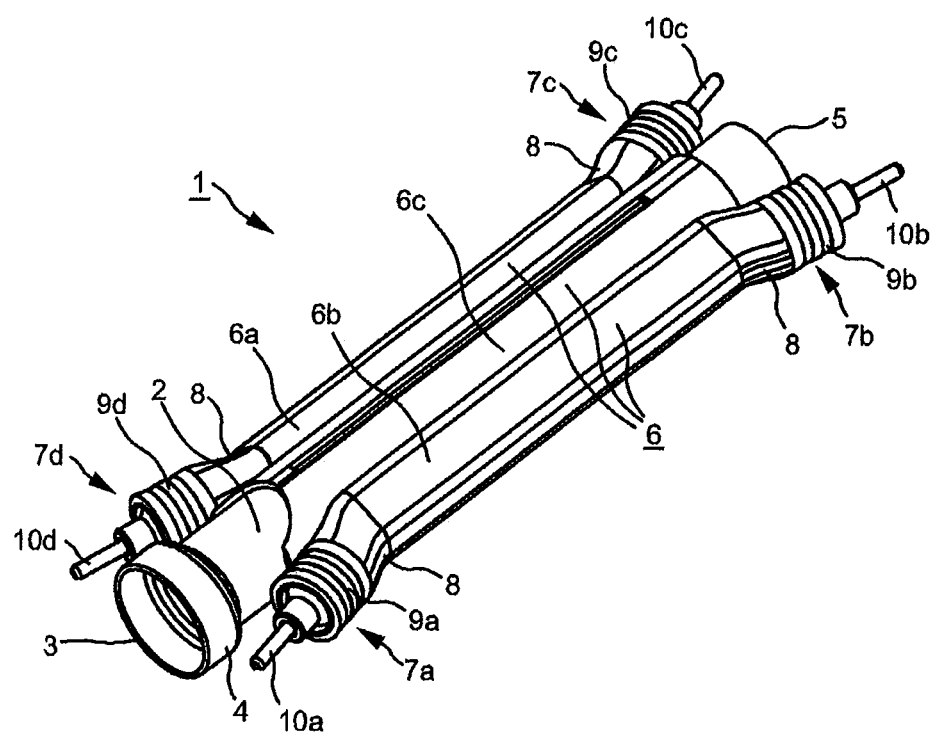
FIG. 1 shows a metal pipe with heating device for a fluid heater according to the invention.

FIG. 1 shows, as a basic element of an inventive fluid heater 1, a metal pipe 2 and a heating device 6 consisting of two identical tubular heating elements 6a, 6b, and a heat conducting means 6c.

Metal pipe 2 has an opening 3 in a widened first end portion 4 having an enlarged cross-section compared to the rest of the metal pipe. At the end portion 5 of metal pipe 2, opposite the widened end portion 4, a sealing plug or end cap 50 (cf. FIGS. 4, 5, 9) may be provided in order to seal said end hermetically and pressure-tightly.

The heating device 6 shown in FIG. 1 consists of the tubular heating elements 6a and 6b and of the heat conducting means embodied as heat-conducting plate 6c. Whereas heat-conducting plate 6c completely surrounds metal pipe 2 in the circumferential direction, tubular heating elements 6a and 6b are spaced equidistantly apart in the circumferential direction at opposite peripheral sections of metal pipe 2 and are respectively arranged with their longitudinal direction parallel to the longitudinal direction of metal pipe 2.

The respective—preferably cold, i.e. unheated—ends 7a, 7b, 7c, 7d of tubular heating elements 6a, 6b are each raised from or bent away from metal pipe 2 by a bend. As a result, only the heated region of tubular heating elements 6a, 6b is in contact with the surface of heat-conducting plate 6c. The bend also makes it easier to apply contacts to heating elements 6a, 6b. Ends 7a, 7b, 7c, 7d of tubular heating elements 6a, 6b each have a multi-step pinch or crimping 9a, 9b, 9c, 9d, by means of which they each sealingly and securely enclose one of the closure beads holding electrical terminal studs 10a, 10b, 10c, 10d.

Figure 2A:
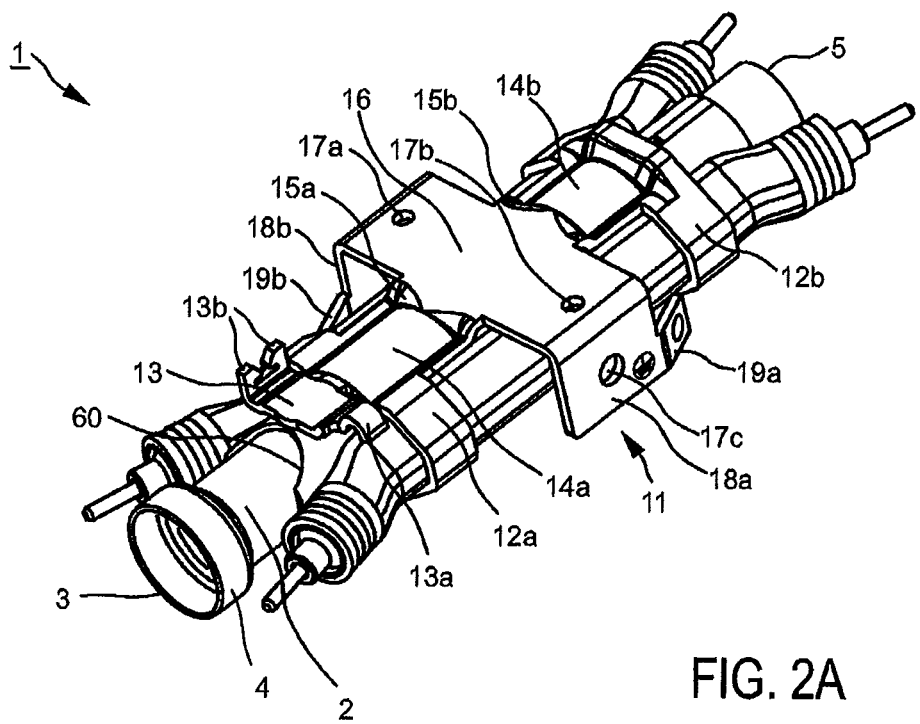
FIG. 2a shows a metal pipe with heating device and mounting bracket of a fluid heater according to the invention.

FIG. 2a shows the arrangement depicted in FIG. 1, with an additional mounting bracket 11. By means of clips 12a, 12b, mounting bracket 11 clasps not only tubular heating element 6a but also tubular heating element 6b and heat-conducting plate 6c, thus securing the arrangement of metal pipe 2, heating device 6 and mounting bracket 11 to each other, i.e., it holds these together. In the direction of opening 3 of metal pipe 2, mounting bracket 11 has a sensor section 13 for a temperature sensor, such as an NTC sensor, for example, said sensor section 13 having a downward hook 13a on the side to its right in the picture, and two engagement hooks 13b on the side to its left, as fixing means for a sensor. In the longitudinal direction of metal pipe 2, a first heat conducting section 14a, on which the clip sections of clip 12a are laterally provided, abuts sensor section 13. The first heat-conducting section 14a lies with substantially its entire surface on heat-conducting plate 6c.

In order to also conduct the heat generated in tubular heating elements 6a, 6b away from those surface regions of tubular heating elements 6a, 6b that do not have surfaces in contact with heat-conducting plate 6c, to metal pipe 2, and to ensure that heat is conducted well to sensor section 13 in the event of tubular heating elements 6a, 6b overheating, the clip portions of clips 12a, 12b are mounted at approximately half the longitudinal extension of the respective heat conducting portion 14a, 14b, namely at that section which faces towards opening 3 of metal pipe 2 or towards sealing plug 5.

Opposite sensor section 13, a first connecting section 15a abuts the first heat conducting section 14a, said first connecting section 15a sticking out in a substantially S-shaped manner from the first heat-conducting section 14a, and transitions into a planar mounting section 16, spaced substantially uniformly from metal pipe 2, for a protective device (such as the one shown in FIG. 2B) and if necessary for a connection means such as a plug connector. Mounting section 16 has through holes 17a, 17b, 17c, 17d, for example for screws or rivets.

Transversely to the longitudinal direction of metal pipe 2, a first side portion 18a and a second side portion 18b abut mounting section 16. Both are angled by approximately 90° to the plane of section 16 for the connection means in the direction of tubular heating elements 6a, 6b and each have a hole 17c, 17d, respectively. In their respective lower region, first and second side portions 18a, b, each have a mounting tab 19a, 19b that is bent a little relative to the plane of side portions 18a and 18b in the direction of the respective tubular heating elements 6a, 6b. Mounting tabs 19a, 19b each have a hole with which an earth contact, for example, can be connected to the mounting bracket or with which the entire component can be fixed or secured to a mounting bracket in a household appliance, such as a coffee machine. The same also applies, of course, to through holes 17c and 17d in side portions 18a, 18b.

Figure 8A:
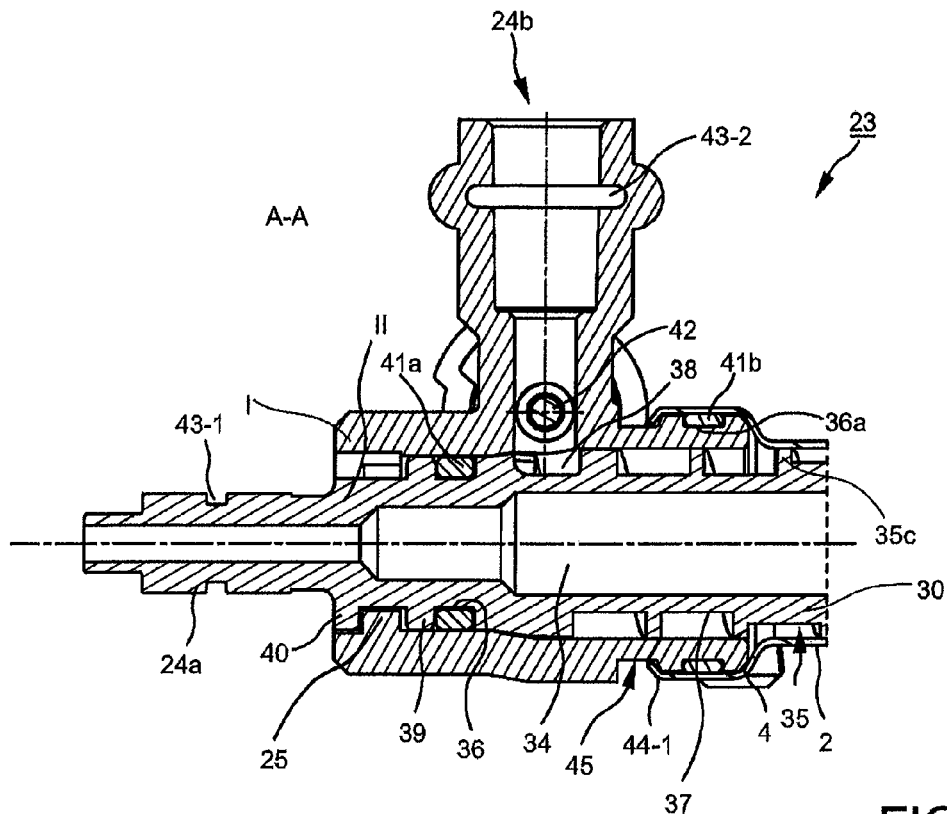
FIG. 8a shows a sectional view through an inventive fluid connector assembly of the fluid heater shown in FIG. 5.

Reference is also made to the notch 60 in heat-conducting plate 6c, shown in FIGS. 1 and 2a. The purpose of this notch 60, for end 3 of metal pipe 2, is to systematically influence the heat transfer paths between heating device 6 and the fluid connector assembly at the end of the metal pipe. Notch 60 must be dimensioned so that the conduction of heat from the heat-conducting plate to the end 3 of metal pipe 2, which consists of the stainless steel that conducts heat poorly, is reduced so that, in the event of an error such as when the fluid heater runs dry, existing safety mechanisms are activated before, for example, a fluid connector assembly made of plastic and disposed at end 3, as illustrated in FIG. 8a, is damaged by overheating.

Figure 2B:
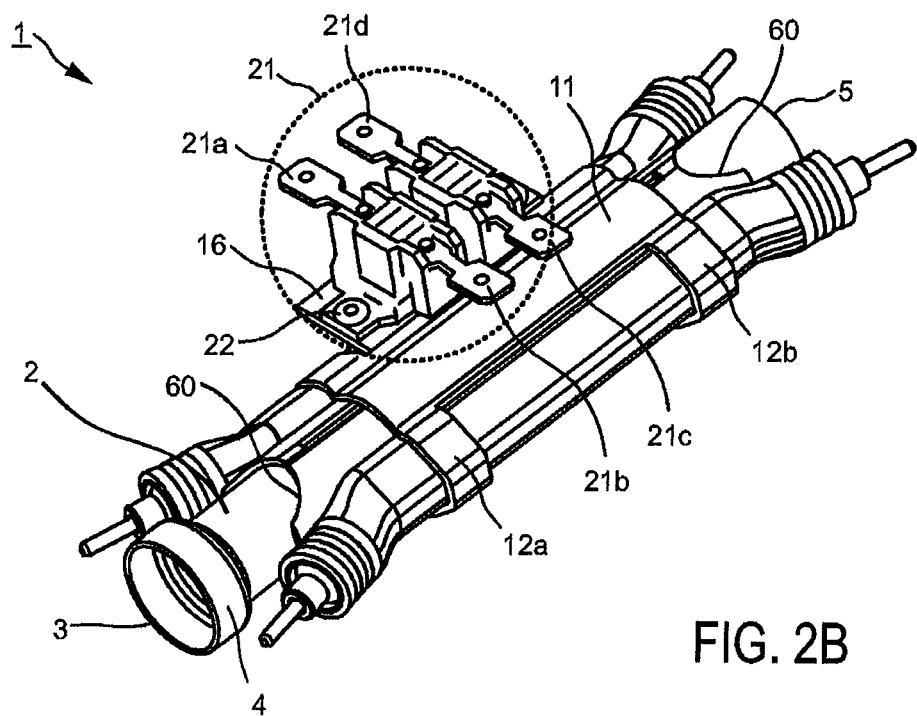
FIG. 2b shows a metal pipe with heating device and alternative mounting bracket and with a geometrically modified heat conducting means of a fluid heater according to the invention.

FIG. 2b shows a modified variant of the arrangement shown in FIG. 2a. Mounting bracket 11 differs from the one in the embodiment in FIG. 2a in that mounting section 16 is arranged asymmetrically in relation to the rest of the mounting bracket. Compared to the arrangement shown in FIG. 2a, mounting section 16 in FIG. 2b is designed as a region which laterally protrudes with an offset from the central longitudinal axis of mounting bracket 11, and which could be referred to as a "flag" or "metal flag". The protective device 21 in the form of a twin fuse attached thereto is discussed in more detail below with reference to FIG. 3 and FIG. 10.

The function of the mounting section 11 shown in the Figure is comparable with the one shown in FIG. 2a. For example, it is possible and intended that a connection means and/or protective devices be mounted on mounting section 16. What is not shown, yet nevertheless possible. is an arrangement of additional side parts and/or mounting tabs as described with reference to FIG. 2a.

Another difference between the devices shown in FIG. 1 and FIG. 2a consists in the design of the heat-conducting plate in FIG. 2b. In the embodiment shown in FIG. 2b, a notch 60 can be seen on the top side at each of the two ends 3, 5 of metal pipe 2, i.e. on the side of the fluid heater facing towards the viewer. As in the embodiment shown in FIG. 2a, the purpose of these two notches 60 is to systematically influence the heat transfer paths, at the two ends 3, 5 of metal pipe 2, between heating device 6 and the temperature sensors and/or safety devices, and between heating device 6 and the component at the end of the metal pipe.

Figure 3:
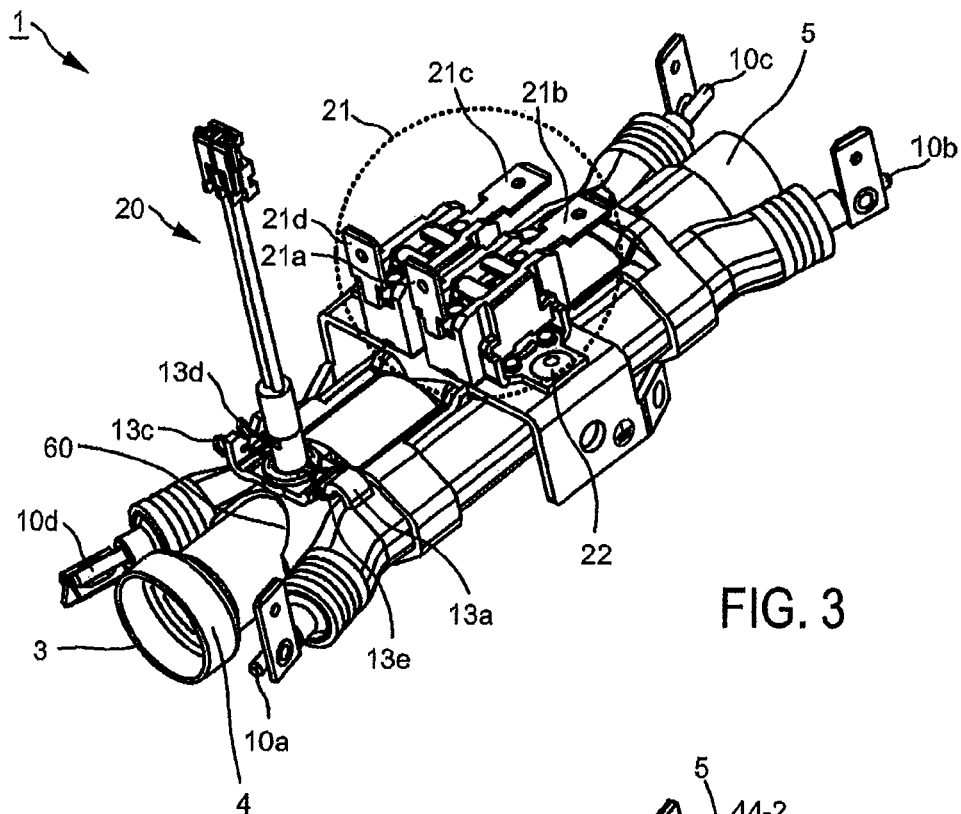
FIG. 3 shows the assembly shown in FIG. 2a, to which a safety temperature limiter and an electrical protective device have been added.

FIG. 3 shows the arrangement shown in FIG. 2a, to which a temperature sensor 20 has been added that is disposed in heat-conducting contact on sensor section 13 and which is spaced apart substantially perpendicularly from the latter. Temperature sensor 20 is pressed against sensor section 13 by a fixing means in the form of a spring wire member comprising two catch springs 13c, 13d and a loop 13e. Loop 13e engages the downward hook 13a of mounting bracket 11 and biases temperature sensor 20 in co-operation with the catch springs 13c, d formed on the opposite side, which each catch under an engagement hook 13b.

Compared to the arrangement shown in FIG. 2a, an electrical protective device 21 is fixedly attached to mounting section 16 of mounting bracket 11 by means of respective rivets 22. The electrical protective device 21 has connection lugs 21a, 21b, 21c, 21d, via which electrical energy can be drawn from the periphery and forwarded to electrical terminal studs 10a, 10b, 10c, 10d of the tubular heating element.

For each of the connector leads, protective device 21 preferably contains a fuse element which permanently stops the flow of electrical current when a predetermined temperature is exceeded. Since two connector leads are provided, there are two fuse elements, which explains the designation "twin fuse".

FIG. 3 also shows, at the electrical terminal studs 10a, 10b, 10c, 10d of tubular heating elements 6a, 6b, connection lugs that are fixed by spot welding, for example, onto which cable shoes can be pushed to establish electrical contact. Like connection lugs 21a, 21b, 21c, 21d of electrical protective device 21, these connection lugs can serve, for example, as plug contacts for connecting to connection lugs 21a, 21b, 21c, 21d of electrical protective device 21 by means of respective connecting cables.

Figure 4:
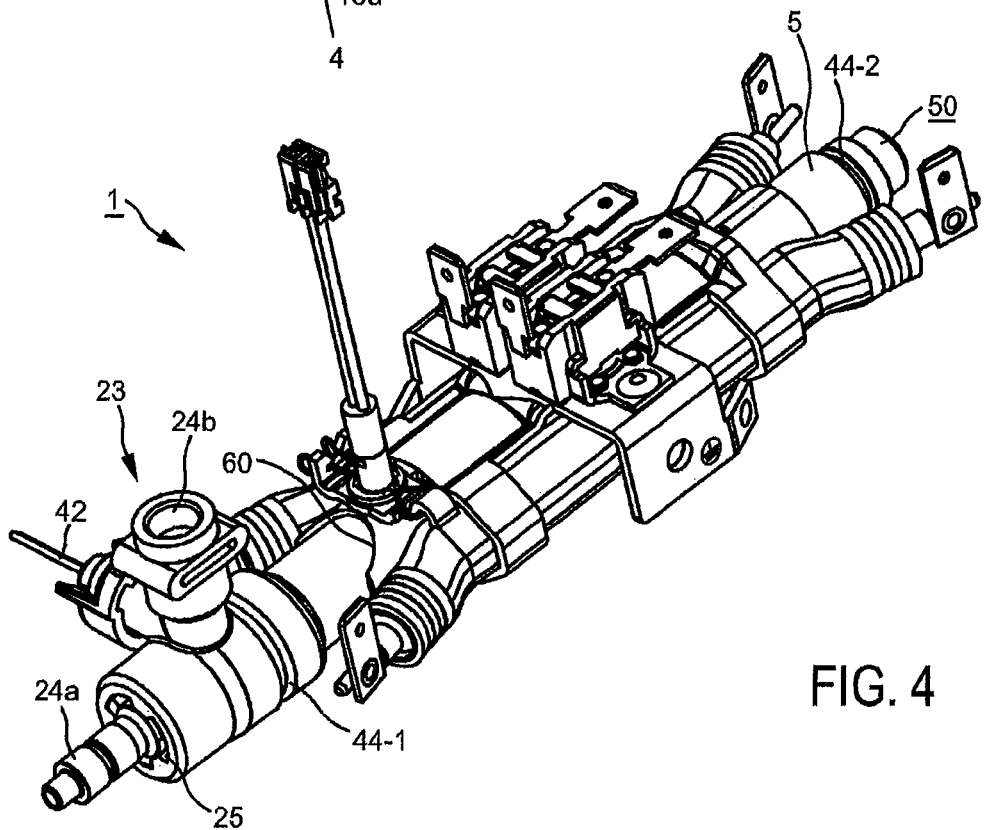
FIG. 4 shows the assembly shown in FIG. 3, to which a fluid connector assembly according to the invention has been added.

FIG. 4 shows the arrangement depicted in FIG. 3 with an additional fluid connector assembly 23. Fluid connector assembly 23 has a first fluid connector 24a and a second fluid connector 24b, the respective base member of each is connected by a bayonet lock-type connection. By means of a bayonet lock part provided on the base member of the first fluid connector 24a and a bayonet lock counterpart 40 formed on the base member of the second fluid connector 24b bayonet connection 40 (see FIGS. 7 and 8a), the first fluid connector 24a and the fluid guiding core 34 are locked in the fluid connector assembly 23.

Whereas the first fluid connector 24a lies substantially in the longitudinal axis of metal pipe 2, the second fluid connector 24b is connected substantially perpendicularly to the first fluid connector 24a to the substantially cylindrical outer surface of a sheath-like or bushing-like element of the fluid connector assembly 23.

A holder for a first temperature sensor 42 for detecting the discharge fluid temperature is joined, likewise perpendicularly, to the second fluid connector 24b.

It should also be mentioned that fluid connectors 24a, 24b have known locking mechanisms for fixing connectors for any fluid guiding means, the locking mechanisms being dimensioned in such a way that they can withstand the pressure inside the fluid heater. Individual functions and features of the details shown are discussed further below with reference to the cross-sectional views in FIGS. 8a and 9.

FIG. 4 also shows a sealing plug 5a in the second end portion 5 of metal pipe 2. For temperature stability reasons, sealing plug 5a may be made of metal, in particular of stainless steel, or of a temperature-resistant plastic, in particular a PPA (polyphtalamide), a PPS (polyphenyl sulfide), or a PEI (polyetherimide) and may be connected interlockingly by a fold 5b in the abutting edge of metal pipe 2 to the latter.

A "fold" is understood here as a tapering in the cross-section of the peripheral end of metal pipe 2 around sealing plug 5, achieved by plastic deformation. The fold forms an undercut in a structure around sealing plug 5a and hence a form-locking connection that cannot be released without destroying the arrangement. As mentioned at the outset, the fold need not be provided around the entire circumference. It suffices, rather, if the back edge or closing edge of metal pipe 2 is folded in portions thereof only.

Figure 5:
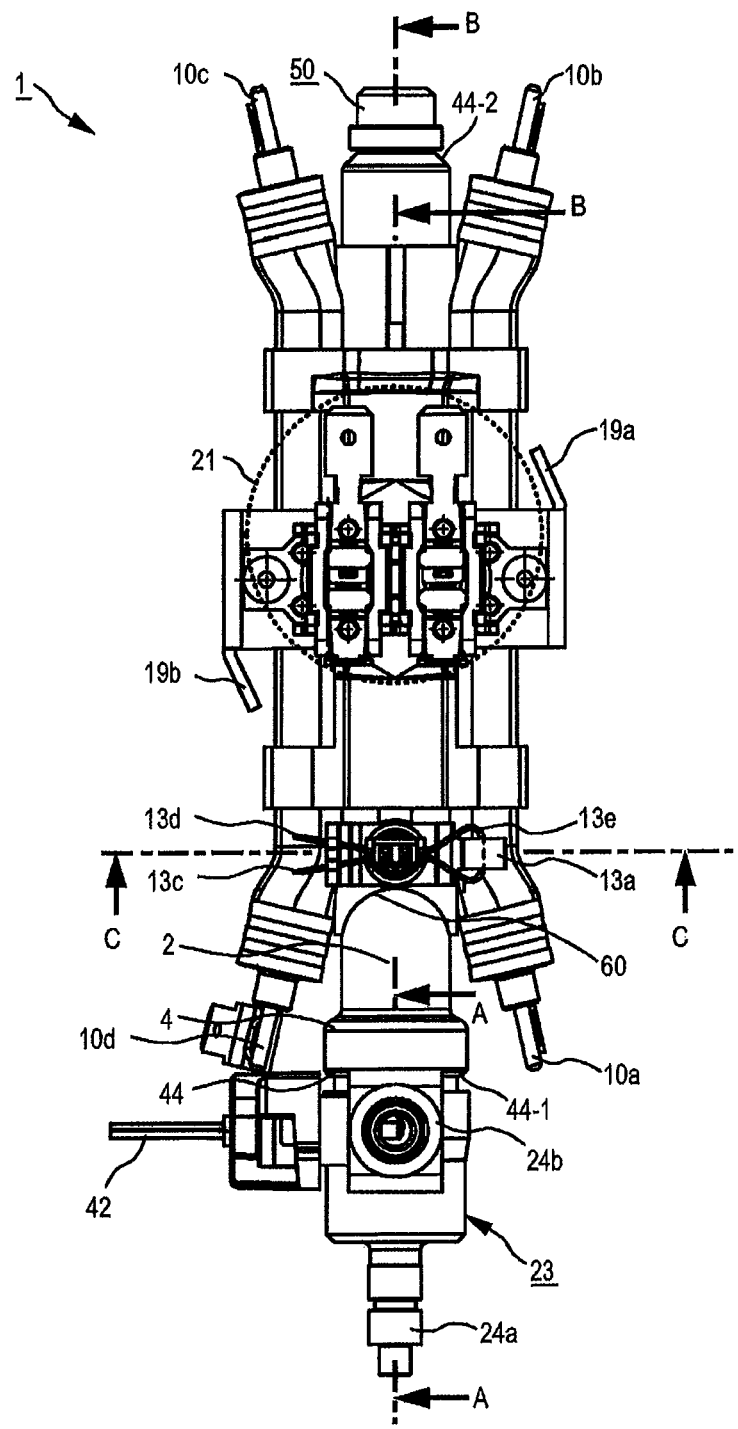
FIG. 5 shows a plan view of the fluid heater shown in FIG. 4.
Figure 6:
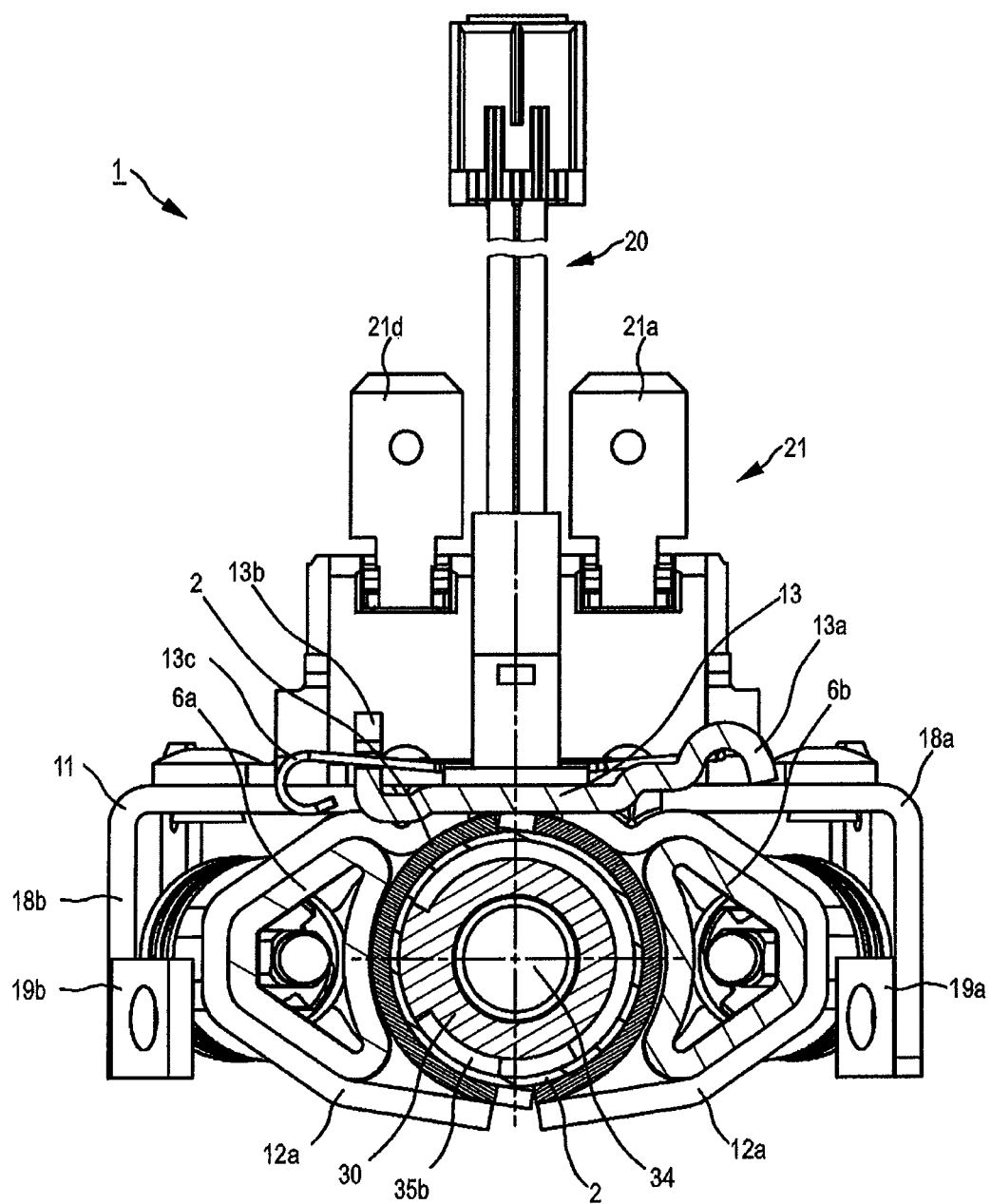
FIG. 6 shows a sectional view through the fluid heater shown in FIG. 5.
Figure 9:
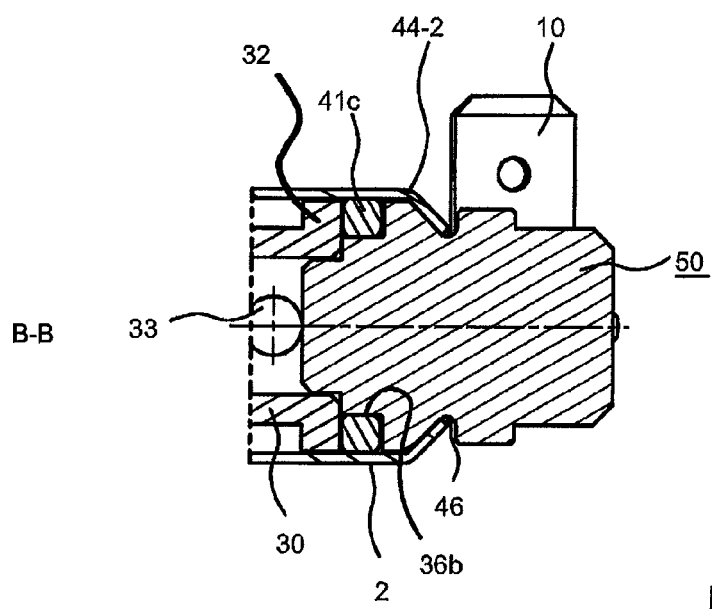
FIG. 9 shows a sectional view through a sealing plug or end cap of the fluid heater shown in FIG. 5.

FIG. 5 shows a plan view of the arrangement shown and described in FIG. 4 and defines the position of sectional planes A-A, B-B and C-C for cross-sectional views shown in FIGS. 6, 8a and 9.

FIG. 6 shows a cross-section along sectional plane C-C in FIG. 5, i.e. a plane perpendicular to the longitudinal axis of metal pipe 2 at safety temperature sensor 20. This view specifically illustrates the compact position of heating device 6 and of the fluid conduit through metal pipe 2.

The key element of the view is a cavity inside a fluid guiding core 30, said cavity forming a second fluid channel section 34 for conducting the fluid. A helical first fluid channel section 35 (see FIG. 7) runs around a fluid guiding core 34, which shall be described in further detail with reference to FIG. 7, the material being cut between two adjacent side walls 35*b* on the left-hand side, or more precisely between the eight o'clock and the ten o'clock position.

Fluid guiding core 30 is fitted without play into metal pipe 2, which for its part is surrounded by heat-conducting plate 6*c*. Whereas metal pipe 2 is made of a stainless steel, heat-conducting plate 6*c* has a higher thermal conductivity by consisting of aluminum, copper or some other suitable metal or suitable metal alloy.

To improve the solder joint joining heat-conducting plate 6*c* to metal pipe 2 and to tubular heating elements 6*a*, 6*b*, heat-conducting plate 6*c* may have through holes or slots which permit soldering agent or fluxing agents to pass through during the soldering operation, thus resulting in uniform distribution of the solder or fluxing agent between the components.

On the left and right of the picture, the joins of the contact surfaces of tubular heating elements 6*a* and 6*b* between the two o'clock and the four o'clock position, and between the eight o'clock and the ten o'clock position are shown. It is clearly shown that concave contact surfaces of tubular heating element 6*a*, 6*b* correspond to a convex or cylindrical surface of heat conducting means 6*c*. This ensures best possible direct transfer of heat between the surface of tubular heating elements 6*a*, 6*b* and heat-conducting plate 6*c*.

The arrangement described above is surrounded by clip 12*a* and clip 12*b* (not shown in this Figure) of mounting bracket 11, which provide additional heat transfer between the surface of tubular heating elements 6*a*, 6*b* and the surface of heat-conducting plate 6*c*. In combination with the contour of the first heat transfer portion 14*a*, which is matched exactly with the contour of portions of heat-conducting plate 6*c*, this improves transfer of the heat generated in tubular heating elements 6*a*, 6*b* into heat-conducting plate 6*c* and further to metal pipe 2.

FIG. 6 also shows the direct attachment of sensor section 13 to the top side of heat-conducting plate 6*c*. The cross-section also illustrates the interaction between downward hook 13*a*, with which loop 13*e* engages, and engagement hook 13*b*, with which catch springs 13*c*, *d* engage, in connection with the portion therebetween, which presses a base of safety temperature sensor 20 firmly onto sensor section 13 of mounting bracket 11. Catch springs 13*c*, 13*d*, and the holding member with loop 13*e*, may be made, for example, of wire and/or a spring steel to ensure a suitable biasing force for attaching the safety temperature sensor 20 to mounting bracket 11.

Figure 7:
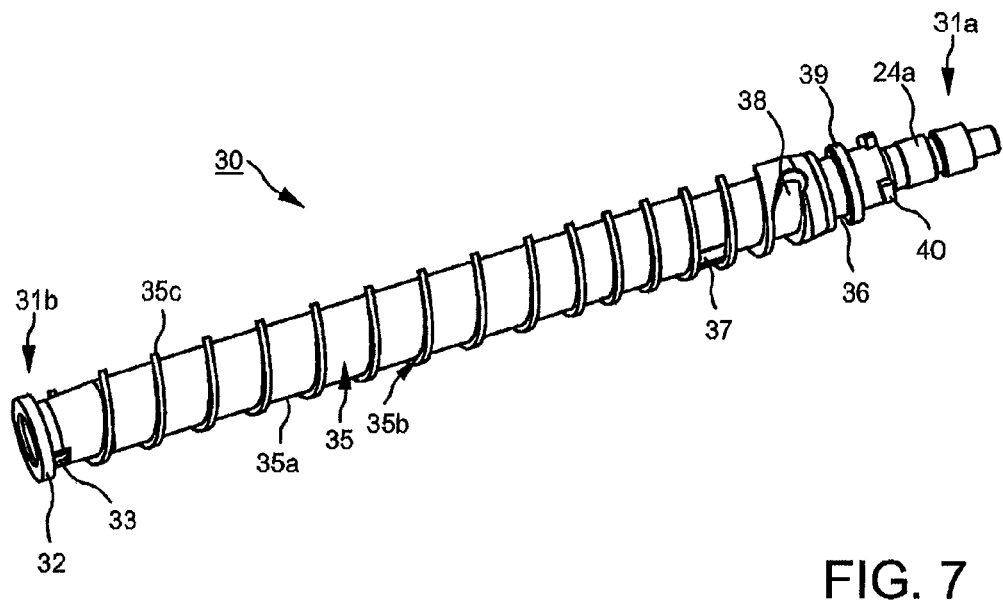
FIG. 7 shows a fluid guiding core for a fluid heater according to the invention.

FIG. 7 shows the fluid guiding core 30 which in FIG. 4 is introduced into metal pipe 2 and which has the first fluid connector 24*a* in the region of a first end 31*a*. The first fluid connector 24*a* is already shown in FIG. 4. The bayonet lock counterpart 40, which interacts with the bayonet lock part 25 discussed in connection with FIG. 4, can likewise be seen at the first end 31*a*. A second rim 39, behind which a first sealing groove 36 for inserting or injecting sealant is provided, is attached to bayonet lock counterpart 40 and to the free region provided for locking with bayonet lock part 25.

A first rim 32, which will be discussed more precisely with reference to FIG. 9, is disposed at the second end 31*b* of fluid guiding core 30. In the immediate vicinity of the first rim 32, a through hole 33 is provided which hydraulically connects the second fluid channel section 34 disposed inside fluid guiding core 30 to the first fluid channel section 35 disposed on the outside of fluid guiding core 30. In other words, cold fluid flowing to the inside of fluid guiding core 30 can enter through through hole 33 to the surface of fluid guiding core 30, where it comes into contact with the heated inner side of metal pipe 2. The first fluid channel section formed on the outside of fluid guiding core 30 is bounded by the floor 35*a* and the side wall 35*b*. Thus, the first fluid channel section 35 and side wall 35*b* wind themselves helically on the top side of fluid guiding core 30 in the direction of its first end 31*a*.

In the heated region, the depth of the first fluid channel section 35 and the height of its side wall 35*b* are substantially constant. However, the pitch of the ridge forming side wall 35*b* decreases towards the fluid discharge, with the result that the width of the first fluid channel section 35 decreases in the direction of the first end 31*a*.

A depth change 37 in the fluid channel is formed approximately at the beginning of the penultimate turn of the helix of the first fluid channel section 35 and is used to deepen and hence partially increase the cross-section in the first fluid channel section 35. The aim of this measure is to obtain as large a radius as possible for deflecting the fluid flow and to adapt the cross-section to through hole 33, in order to avoid any "dead volume", i.e. any fluid channel section through which flow is poor.

Due to the enlarged fluid channel cross-section, the flow velocity of the fluid flowing therein decreases. This results in pressure dropping less dynamically in this region, and in less flow noise and less cavitation occurring.

The side wall of fluid channel end 38 is cylindrical in some sections, in order to match the free cross-section of the second fluid connector 24*b* (see FIGS. 4 and 8*a*). Due to the relative position or positioning between connector assembly 23 and fluid guiding core 30 being systematically defined by means of the connecting device, consisting here of bayonet lock part 25 and bayonet lock counterpart 40, the flow of fluid from the first fluid channel section 35 into the second fluid connector 24*b* in a fluid-mechanically favorable manner is assured.

Fluid guiding core 30 is preferably made of metal, in particular of stainless steel, or of a temperature-resistant plastic, in particular a PPA (polyphtalamide), a PPS (polyphenyl sulfide), or a PEI (polyetherimide).

FIG. 8*a* shows a cross-section along the plane, marked A-A in FIG. 5, through fluid connector assembly 23 along the longitudinal direction of metal pipe 2. Fluid connector assembly 23 is a combined fluid connector assembly consisting of a first part I and a second part II, which includes not only the first fluid connector 24*a* with the fluid inflow but also the second fluid connector 24*b* with the fluid discharge from the fluid heater. In other words, the outlet and the inlet are advantageously provided at one end of the fluid heater.

The first fluid connector 24*a*, comprising a circumferential locking groove 43-1 for securing a fluid guiding means, is shown on the left in FIG. 8*a*, on the second part II of fluid connector assembly 23. A suitable counterpart for attaching peripheral fluid guiding means to the first fluid connector 24*a* could be embodied like the second fluid connector 24*b* on the first part I, for example. The substantially tubular second fluid connector 24*b* is provided, as shown in FIG. 4, with an insert or insertion option comprising a guide groove 43-2 for a catch. Due to grooves 43-1, 43-2 provided in the first fluid connector 24*a* and in the second fluid connector 24*b* being designed to match each other, it is possible to prevent any release of the assembled connections, when such fluid connectors of complementary design are connected to each other by inserting or pushing through, perpendicularly to the direction of flow, an appropriately configured safety element, such as a latch (not shown) in the form of a wire spring, with the result that such connections can withstand strong pressures. It should also be noted that the complementary design of fluid connectors 24a and 24b advantageously prevents connections being confused during installation, for example in a coffee machine.

In the fluid connector assembly 23 in FIG. 8a, the second part II is integrally embodied on fluid guiding core 30, i.e. the second part II has been integrally manufactured with fluid guiding core 30, for example by means of injection molding. The first fluid connector 24a lead fluid to be heated from the right through the second part II of fluid connector assembly 23 into the second fluid channel section 34. The first part I of fluid connector assembly 23 is locked by means of a bayonet lock counterpart 25 formed on the second fluid connector 24b, by co-operation with the bayonet lock counterpart 40 formed on the second part II. The connection can also be made, of course, using a different connecting principle, such as a screw connection or a snap-locking connection, for example. In the embodiment shown in FIG. 8a, a pure plug connection is also conceivable, since the first part I and the second part II of fluid connector assembly 23 can be permanently fixed in a specific position in relation to each other by means of the fold 44-1 in metal pipe 2.

The cross-section also shows a circumferential second rim 39 and a first sealing groove 36 formed with it on the second part, in which groove a circumferential sealing means in the form of a rubber seal 41a in the shape of an O-ring is provided in order to seal the two parts I, II against each other.

Temperature sensor 42 on the first part I in the second fluid connector 24b, shown from the outside in FIG. 4, is shown in a cross-sectional view perpendicular to its axis. A sensor tip projects into the free cross-section of the second fluid connector 24b, where it allows the fluid temperature in the region of the fluid outlet to be accurately measured.

In the part of the fluid guiding core 30 shown on the right in FIG. 8a, the depth change 37 in the first fluid channel section 35 discussed with reference to FIG. 7 can be seen. The last turn of the helix of the first fluid channel section 35 ends as fluid channel end 38, which is positioned in relation to the longitudinal axis of the second fluid connector 24b such that heated fluid can be channeled away in the radial direction with the second fluid connector.

FIG. 8a also shows the first end portion 4 with the cross-sectional enlargement of metal pipe 2 for receiving part of the fluid connector assembly 23 inside metal pipe 2. The first end portion 4 of metal pipe 2 is plastically formed into a fold (folded), at least in portions of the circumferential closing edge of metal pipe 2. The metal pipe 2 encases a seal 41b disposed in a second sealing groove 36a, which seals the first part against the inner side of metal pipe 2. By engaging a third groove 45 on the outer side of fluid connector assembly 23a, fold 44-1 forms a positive-engagement locking mechanism in the form of an undercut. As a result, seal 41b is pressed by metal pipe 2 into groove 36a, thus sealing fluid connector assembly 23 against the metal pipe 2 in a fluid-tight and pressure-tight manner.

In order to release the connection described above between bayonet lock part 25 and bayonet lock counterpart 40, the second fluid connector 24b would have to be twisted in relation to the first fluid connector 24a and fluid guiding core 30, and pulled off to the left in the picture. Such twisting and pulling off is prevented by the inventive fold 44-1, which undercuts one part of the first fluid connector 24a and engages with the third groove 45. This excludes any unauthorized or non-destructive release from metal pipe 2. The correct arrangement of parts I and II of fluid connector assembly 23 is permanently assured as well.

It should also be noted that the fluid channel end 38 might also be designed as a circumferential groove around the second part II, such that the second fluid connector 24b can be freely twisted in its orientation on the fluid heater, if a plug connection such as a snap-locking connection is used (as in FIG. 8b, for example) to connect the first part I and the second part II. This advantageously allows the fluid discharge to be conveniently positioned, depending on requirements, in the installed position in a coffee machine, for example.

It should be noted that the connection, shown in FIG. 8a, between metal pipe 2 and the second fluid connector 24b, may be effected, of course, without a cross-sectional enlargement 4 of metal pipe 2, provided it is appropriately dimensioned (see also fold 44-2 in FIG. 9). All that is required in this regard is that the two-step cross-sectional enlargement of the free cross-section of the first fluid connector 24a be moved to a region further to the right in the picture, i.e. into the second fluid channel section 34. In other words, the cross-sectional enlargement of the second fluid channel section 34 could be left until the region of the fluid guiding core 30 in which the depth change 37 of the first fluid channel section is formed, or in which the region principally defined by heating device 6 is disposed.

Figure 8B:
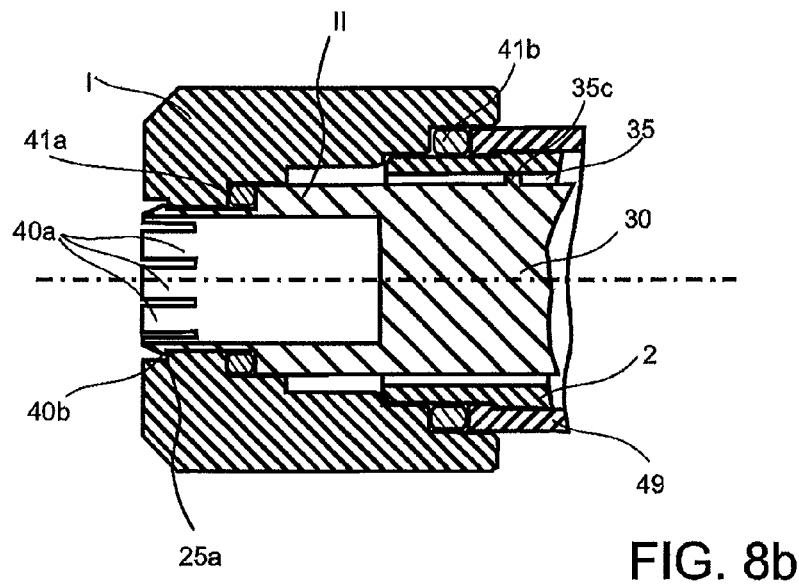
FIG. 8b shows a sectional view of part of the inventive transport device.

FIG. 8b illustrates an alternative embodiment of a fluid connector assembly 23-1 with a first fluid connector 24a, in which fluid is fed into the first fluid channel section 35 on fluid guiding core 30 in a substantially radial direction, as with the second fluid channel connection 24b in FIG. 8a. It should be noted that the actual fluid connector is not shown in FIG. 8b because in the cross-section shown in FIG. 8b it on the side facing away from the viewer.

The second part II of fluid connector assembly 23-1 is again embodied as an integral part of fluid guiding core 30. The connection between the first part I and the second part II is designed as a snap-locking connection. A circumferential latching groove 25a is provided for this purpose on the rim of a central through hole on the first part I. On the second part which is fed through the through hole, a substantially annular rim with latching pins 40a is provided, each of said pins having outwardly extending engagement hooks 40b. After the first part I has been pushed over the second part II, engagement hooks 40b engaged with latching groove 25a, i.e., they undercut the latter and secure the first part I on the second part II.

The following should be noted with regard to the seal for fluid connector assembly 23-1. The first part I is sealed fluid-tightly and pressure-tightly against the second part II by means of a sealing means, shown in FIG. 8b as an O-ring seal 41a. The first part is likewise sealed fluid-tightly and pressure-tightly against the outer surface of the metal pipe by means of a sealing means, shown in FIG. 8b as an O-ring seal 41b. A support sleeve 49 is pushed onto metal pipe 2, which rests against the heat-conducting plate 6c (not shown in FIG. 8b; see FIG. 1, for example) which is likewise situated on the right in FIG. 8b, on metal pipe 2. A circumferential recess 36b in the first part I overlaps support sleeve 49 and forms a circumferential groove therewith, in which O-ring seal 41b is disposed. The end of metal pipe 2 shown in FIG. 8b is decoupled in respect of heat conduction from the heating device of the fluid heater by the support sleeve. Since metal pipe 2 is preferably made of stainless steel, which conducts heat poorly, both the connector assembly and seal 41b are subjected to less thermal load.

It should also be noted that a fluid connector assembly 23-2 with a second fluid connector 24b as fluid discharge for the heated fluid may be embodied in a form substantially identical to fluid connector assembly 23-1 in FIG. 8b. A fluid heater with respective radial fluid inflow and fluid discharge can thus be provided, in which the orientation of the connections can be freely adjusted by making the respective first parts I of the fluid connector assemblies rotatable.

FIG. 9 shows sealing plug 50 from FIG. 4 on one end of metal pipe 2, said sealing plug being required on the other end of the fluid heater in embodiments having a combined connector assembly as shown in FIG. 8a. Sealing plug 50 is inserted into the opening at the second end 31b of a fluid guiding core 30, partially visible on the left-hand side of the Figure. A sealing means in the form of an O-ring-seal 41c is disposed between the first rim 32 of the fluid guiding core 30 and a phase or shoulder running uniformly around sealing plug 50. This O-ring seal 41c—like the aforementioned sealing means 41a and 41b—may consist of a circumferential seal made of EPDM (ethylene propylene diene monomer), NBR (nitrile butadiene rubber), LSR (liquid silicone rubber), FFKM (perfluoronated elastomer), FKM (fluorocarbon) or a high-performance fluoroelastomer, or a TPE (thermoplastic elastomer).

Also provided on sealing plug 50 is a second fold 44-2 (like fold 44-1 described in the foregoing) in the abutting edge or closing edge of metal pipe 2, which engages with a circumferential fourth groove 46 on sealing plug 5. Like fold 44-1 discussed with reference to FIG. 8a, the second fold 44-2 prevents sealing plug 50 from detaching itself from metal pipe 2. As described above, the sealing cap or sealing plug 50 preferably consists of a plastic material. Reference is made in this regard to a special inventive property of the heat conducting means, i.e., of heat-conducting plate 6c in the embodiment shown in FIG. 2B, where a predetermined recess or notch in heat-conducting plate 6c is provided in the heat-conducting means, such that the conduction of heat from the heating device, i.e., the tubular heating elements 6a and 6b, mainly toward sealing plug 50 is determined by the material of which metal pipe 2 is made. Since metal pipe 2 preferably consists of stainless steel, which is a poor conductor of heat, any overheating, and particularly softening, of the plastic sealing plug 50 in the event of malfunction, e.g. if the fluid heater runs dry, or before the protective device formed by twin fuse 21 (cf. FIG. 2B) is activated, or before a respective response to the temperature detected by the temperature sensor 42 (cf. FIGS. 3 and 4), is advantageously prevented.

It should be noted that the sealing plug may also be made of a metal, in particular stainless steel, in order to be able to heat as unrestrictedly as possible the end of metal pipe 2 that is closed by the sealing plug. In such a case (cf. FIGS. 2A, 3, 4, and 5), the inventive design of the heat conducting means at this end of the metal pipe can be left out. It should also be noted that the embodiment in FIG. 2B can be readily applied to the embodiment in FIGS. 2A, 3, 4, and 5, if a sealing plug 50 is made of plastic or if a fluid heater with a respective fluid inlet or fluid outlet made of plastic is provided at a respective end of metal pipe 2.

It should be noted at this point that the sealing plug 50 shown in FIG. 9 may also be integrally embodied with fluid guiding core 30. Fluid guiding core 30 would then be inserted accordingly with its integral sealing plug 50 into metal pipe 2 and locked at the other end with the first part I (cf. FIG. 8a) of the fluid connector assembly.

Figure 10:
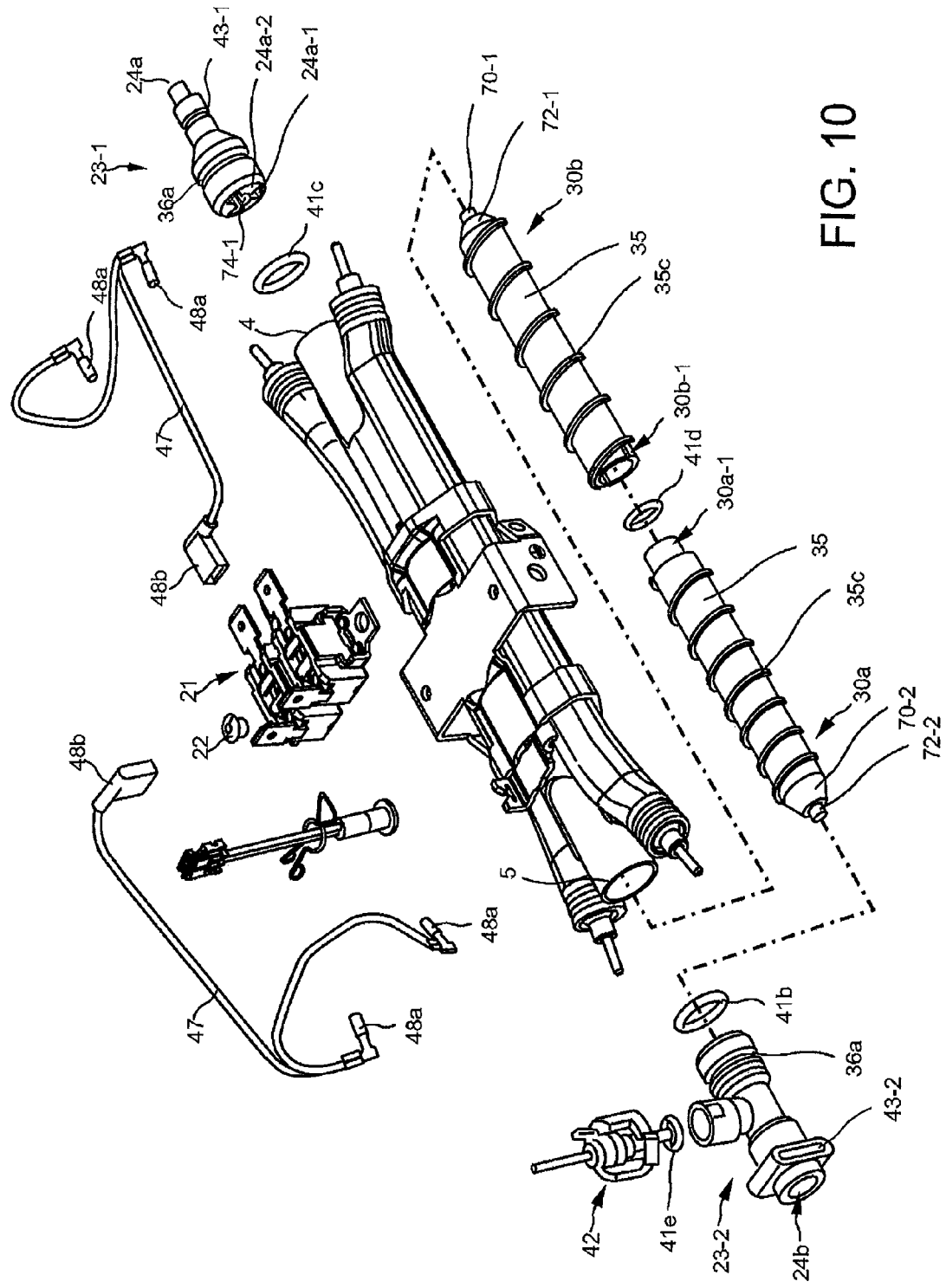
FIG. 10 shows an exploded component or parts diagram of another embodiment of a fluid heater according to the invention.

FIG. 10 shows an exploded view of an embodiment of a fluid heater according to the invention. Most of the features or aspects of the fluid heater have already been described with reference to FIGS. 1 to 9, so the following only discusses some single features or differences in the embodiment shown in FIG. 10.

In the embodiment shown in FIG. 10, the fluid supply and the fluid discharge are at opposite ends of fluid heater 1. A first fluid connector assembly 23-1 with a first fluid connector 24a is provided to supply fluid at the first end 4 of metal pipe 2. Fluid which enters the fluid heater via the first fluid connector assembly 23-1 flows through metal pipe 2 substantially in one direction only (from right to left in FIG. 10), before it is discharged via the second fluid connector assembly 23-2 provided with a second fluid connector 24b. Fluid connector assemblies 23-1 and 23-2 are sealed fluid-tightly and sufficiently pressure-tightly with metal pipe 2 by respective sealing means in the form of O-ring seals 41b and 41c.

A fluid guiding core 30 which is in two parts in this embodiment and which consists of a first fluid guiding core 30a and a second fluid guiding core 30b is drawn outside metal pipe 2 for illustrative purposes only. The two fluid guiding cores can be securely connected to each other via respective connecting sections 30a-1 and 30b-1. One part of the first connecting section 30a-1 with reduced outer diameter engages with one part of a second connecting section 30b-1. A sealing means 41d is provided for this purpose on the one part of the first connecting section 30a-1 in order to connect the latter fluid-tightly to the second connecting section 30b-1. In order to ensure the mechanical stability of the connection between the two fluid guiding cores 30a, b, a bayonet lock-type connection is provided in the example shown. A snap-locking connection or a screw connection or a simple plug connection may also be used, of course.

When manufacturing the fluid heater shown here, the two-part fluid guiding core may be designed advantageously as a hollow body, thus resulting in the respective savings of material.

The ends 70-1, 70-2 of fluid guiding core 30 facing the respective connector assembly 23-1 or 23-2 are frusto-conical in shape, and a centering or connecting nose 72-1 or 72-2 is situated at the respective central end. When the fluid heater is being assembled, the respective connecting nose 72-1 or 72-2 engages with a matching bearing 74-1 in the respective connector assembly 23-1 or 23-2.

It should be pointed out at this point that the side of connector assembly 23-2, with second fluid connector 24b, which faces toward the fluid guiding core and which is not shown from the perspective in FIG. 10, is embodied in exactly the same way in this regard as the first fluid connector 23-1.

In connector assembly 23-1 for supplying fluid, recesses 24a-1 in the form of circular segments for fluid passage are provided, which transition inside connector assembly 23-1 into fluid connector 24a. Between recesses 24a-1 in the form of circular segments for fluid passage, rims 24a-2 are situated, which are likewise in the form of circular segments and which together form the bearing 74-1 for connecting nose 72-1. It should be noted at this point that rims 24a-2 may also have a different shape from that of a circular segment.

The configuration with recesses 24a-1 in the form of circular segments for fluid passage, in combination with frusto-conical end 70-1, has proved to be particularly good with regard to flow dynamics. More particularly, this embodiment is advantageous with regard to the prevention of limescale deposition at the transition from the first fluid channel section 35 to the second fluid connector assembly 23-2.

FIG. 10 likewise shows electrical leads 47, with which the tubular heating elements 6a, 6b of the fluid heater shown in the Figure are supplied with electrical energy. Electrical leads 47 are attached to electrical terminals 10a, 10b, 10c, 10d of the tubular heating elements by means of respective contact sleeves 48a. In order to increase the mechanical stability of the connections, contact sleeves 48a can be mechanically deformed after they have been positioned on electrical terminals 10a, 10b, 10c, 10d, as a result of which the electrical contact resistance of the connections is reduced.

A plug connector 48b is provided on the respective other ends of electrical lead 47 from the two contact sleeves 48a. It is used to connect the electrical lead to the respective connection lugs 21a and 21d and 21b and 21c of the two fuse elements of protective device 21. Plug connectors 48b are in the form of sleeves and are provided on the outside with insulation.

When contact sleeves 48a are connected to the tubular heating elements 6a, 6b, as indicated, the tubular heating elements are electrically connected in parallel, so the maximum heating capacity is reached when they are connected to a voltage source.

Whereas the second fluid connector assembly 23-2 with the fluid discharge is fitted, as shown in the Figure, with a temperature sensor 42 in the form of an NTC resistor with which the temperature of the heated fluid can be measured, the first fluid connector assembly 23-1 is significantly more simple in design in this embodiment. For example, no temperature sensor is provided for measuring the temperature of the fluid being supplied. However, if this is advantageous for operating the arrangement shown in the Figure, in view of the control engineering envisaged, an additional temperature sensor may also be provided on the first fluid connector assembly 23-1, like on the second fluid connector assembly 23-2.

Figure 11:
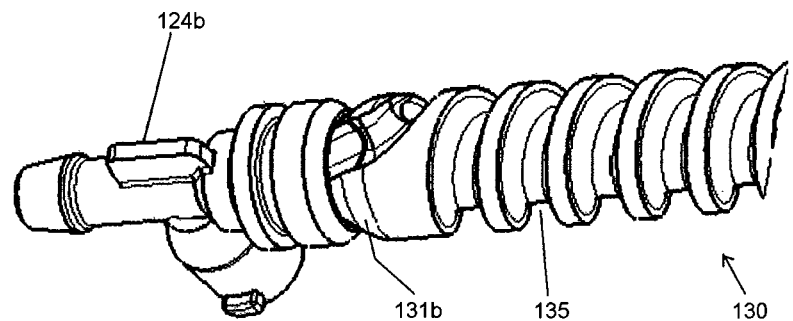
FIG. 11 shows a partial view of another embodiment of a fluid heater according to the invention, showing one end of a fluid guiding core sunk into a fluid connector.
Figure 12:
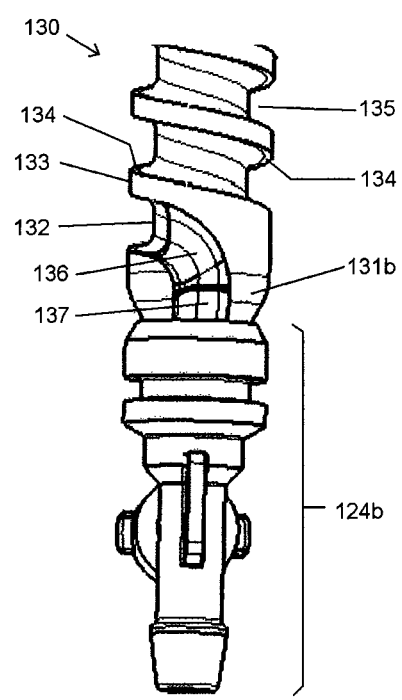
FIG. 12 shows a partial view of the embodiment in FIG. 11 from a different perspective.

FIGS. 11 and 12 show, in partial perspective views, another particularly advantageous embodiment of a fluid guiding core 130 and of a matching fluid connector 124b. In this embodiment, at least one end 131b of the fluid guiding core, preferably on the hot fluid discharge side, is frusto-conical in shape and is sunk into a funnel-like opening 125 of fluid connector 124b. Fluid connector 124b, also shown in cross-section in FIG. 13, has also a fluid connector channel 126 of preferably circular cross-section adjoining funnel-like opening 125 and leading to a connection piece for a tube or some other fluid discharge means. The transition between opening 125 and channel 126 may be rounded or at least deburred to ensure that the transition is as smooth and kinkless as possible and interferes as little as possible with the flow of fluid. In addition, a connection piece or receiving port 127 for a temperature sensor 42 or similar device projecting into the fluid connector channel 126 may be provided on fluid connector 124b.

The helical first fluid channel section 135 winding circumferentially around fluid guiding core 130 transitions at the frusto-conical end 131b of fluid guiding core 130 into an fluid channel end portion, which includes a transitional fluid channel bend 136 and a preferably substantially straight fluid channel end piece 137. Transitional fluid channel bend 136 changes the direction of fluid flow gently and evenly from a helical movement to a substantially straight movement at an angle to the longitudinal axis of fluid guiding core 130. Fluid channel end 137 opens out at the front face of frusto-conical end 131b into the region of the longitudinal axis of the fluid guiding core. The profile of the fluid channel from the first fluid channel section 135 via the transitional fluid channel bend 136 to the orifice of fluid channel end piece 137 is curved as gently as possible and is preferably kinkless. When the fluid heater is fully assembled, the front face of frusto-conical end 131b, with the orifice of the fluid channel end portion, is preferably situated close to the transition of the funnel-like opening 125 into fluid connector channel 126, so that the fluid flow leaving the orifice enters fluid connector channel 126 at an obtuse angle and does not strike any baffle surfaces or sharp edges, and as a result encounters little resistance and is hardly swirled at all. It is preferred that the cross-section of flow of the fluid channel, starting at the helical circumferential first fluid channel section 135 and proceeding via the fluid channel end portion 136, 137 as far as the orifice on the end face of the frusto-conical end 131b of fluid guiding core 130, is substantially constant. In addition, this flow cross-section of fluid channel section 136, 137 is substantially equal to the flow cross-section of fluid connector channel 126. This results in a very uniform flow velocity for the fluid, which is particularly advantageous on the hot fluid discharge side as regards limescale deposition, rinsing of limescale flakes, cavitation, noise, flow resistance etc., since no unnecessary acceleration or delay of the fluid occurs due to obstructions, changes in cross-sectional profile or swirling.

In order to achieve further improvement or uniformity of fluid flow in the fluid channel, the first fluid channel section 135 may be provided with a cross-sectional profile in which a straight groove floor 132 transitions substantially kinklessly in a curve into substantially parallel groove side walls 134. This transitional bend is preferably a quadrant bend. Groove side walls 134 preferably adjoin the outer casing 133 of the fluid guiding core at right angles. This cross-sectional profile preferably continues substantially unchanged in fluid channel end portion 136, 137. This results in a very uniform fluid flow, with a very uniform distribution of velocities in the cross-sectional profile of the fluid channel, which helps to achieve the aforementioned advantages because the cross-sectional profile thus has fewer corners in which a particularly slow flow velocity can ensue.

Figure 13:
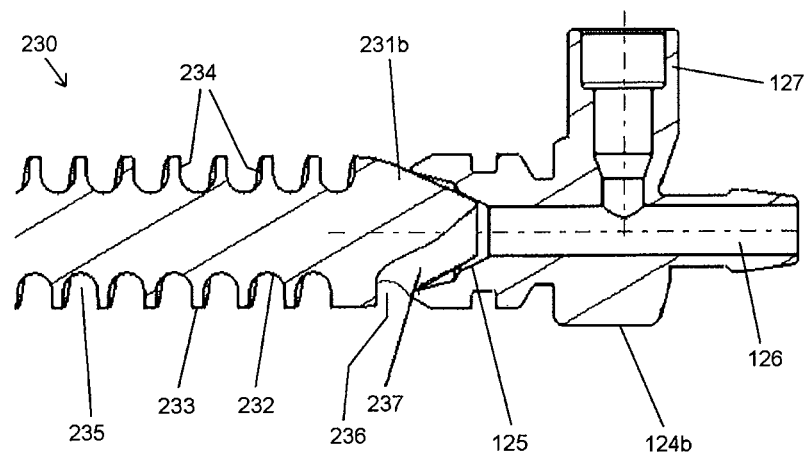
FIG. 13 shows a partial cross-sectional view of the embodiment shown in FIGS. 11 and 12.

FIG. 13 shows another embodiment of a fluid guiding core 230 with a matching fluid connector 124b. Fluid guiding core 230 is similar to the fluid guiding core 130 described in the foregoing and likewise has a frusto-conical end 231b, a helical first fluid channel section 235 and a fluid channel end portion 236, 237, which are arranged in the same way and which co-operate in the same way with fluid connector 124b as fluid guiding core 130. The difference from fluid guiding core 130 is that fluid guiding core 230 has a cross-sectional fluid channel profile comprising a curved groove floor 232 that is preferably semi-circular in shape substantially kinkless parallel groove side walls 234 adjoining the latter. It is also conceivable that the straight groove side walls 234 in the cross-sectional profile be omitted and to have the arcuate groove floor 232 end at the outer casing 233 of fluid guiding core 230. In the same way, the parallel groove side walls 134 of fluid guiding core 130 may also be as short as desired, or may ultimately be omitted entirely. The resultant D-shaped cross-sectional profile of the fluid channel especially favors realization of the aforementioned advantages.

FIG. 14 shows another embodiment of a fluid guiding core 330 with matching fluid connector 224b. Fluid guiding core 330 is preferably in two parts and comprises a substantially cylindrical core 332 and a helix 333 defining a helical circumferential fluid channel section 335 on the outer casing. Alternatively, fluid guiding core 330 may also be embodied in one piece in the form shown here, in which case it is then preferably made of plastic, and particularly preferably of an elastomer. In a two-part embodiment, core 332 may be made of plastic, whereas helix 333 may be likewise made of plastic or of metal, preferably of steel or stainless steel. Helix 333 may be flexible and is preferably pushed onto core 332. As an alternative, however, helix 333 may also be fixed on core 332 with a press fit under a spring biasing force. Core 332 has at least one cone-shaped end 331b, which may or may not project, when the fluid heater (1) is fully assembled, into a funnel-like opening 225 in fluid connector 224b, preferably without touching fluid connector 224. Similarly to fluid connector 124b, fluid connector 224b has a fluid connector channel 226, which is adjoined by the funnel-like opening 225 in a preferably rounded transition and which leads to a connection piece for the fluid guiding means, and optionally a receiving port receiving port 227 for a temperature sensor 42, for example.

In one advantageous development of this embodiment, the apex angle and hence the axial length of the cone-shaped end 331b of core 332 may be chosen so that that a substantially constant flow cross-section is formed from the orifice of the funnel-shaped opening to the transition to fluid connector channel 226. In this way, the fluid flow inside the funnel-like opening 225 is gently and uniformly converted from a helical movement to a largely straight movement in fluid connector channel 226, without the flow being disrupted by any obstructions, such as baffle surfaces or sharp edges, or by abrupt changes in direction. The aforementioned advantages are also achieved with this embodiment of fluid guiding core 330.

Figure 18:
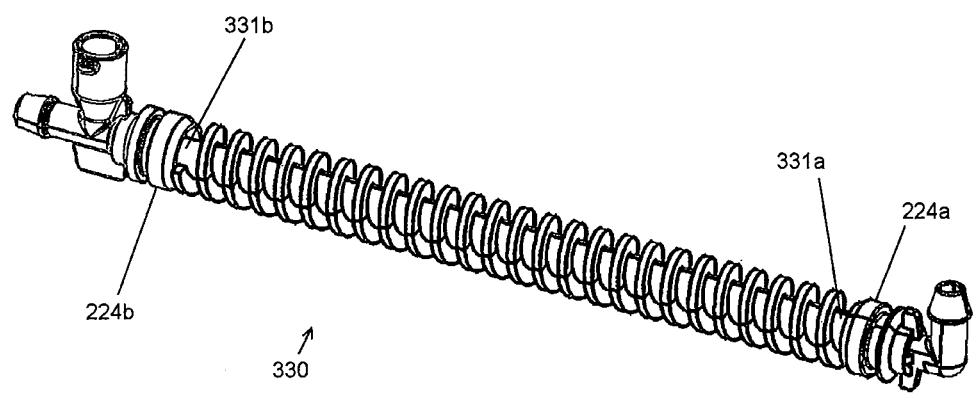

FIG. 18 shows one possible embodiment as a combination of fluid guiding core 330 and fluid connector 224b, as described above, and a further fluid connector 224a which is preferably used as a fluid supply connector. Fluid connector 224a may be similar to fluid connector 224b, as far as fluid guiding is concerned, or alternatively may also be identical to fluid connector 24a, with end 331a of fluid guiding core 330 being formed like end 30b of fluid guiding core 30 in FIG. 10. On the cold fluid supply side of fluid heater 1, the way in which the fluid is guided is less critical because generally no problems arise with the relatively cold fluid as far as limescale deposition, etc. is concerned. Core 332 may be securely attached to fluid connector 224a or 24a in order to facilitate assembly and to ensure that core 332 is placed at the right distance from fluid connector 224b facing it. The preferably flexible helix 333 can then be simply pushed onto core 332 and be disposed with a certain amount of axial play in the fully assembled fluid heater, or may be so long that it abuts fluid connectors 224a, 224b at both its ends with a slight spring pressure and is therefore fixed in place.

Figure 15:
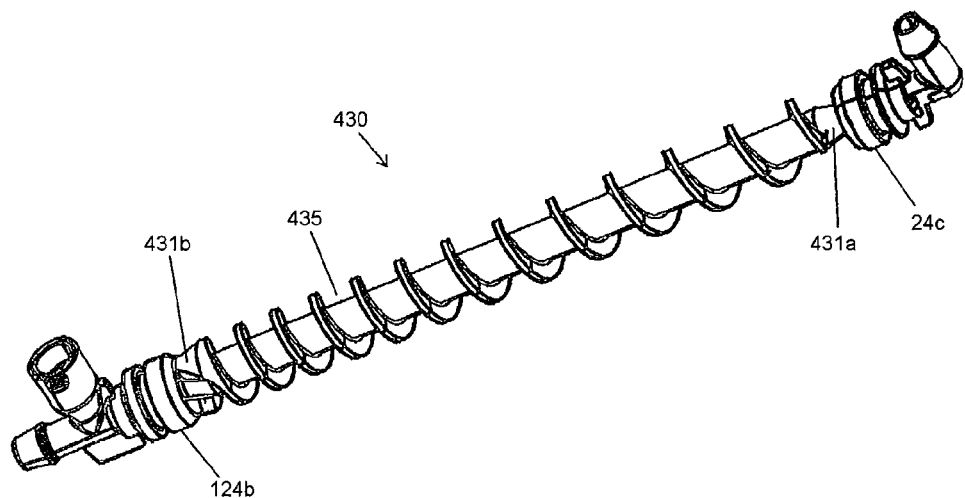

FIG. 15 shows an embodiment of a fluid guiding core 430 with a helical circumferential first fluid channel section 435 which has a variable pitch that decreases in the direction of fluid connector 124b on the outlet side, with the result that the cross-section of flow decreases in the direction of flow and that the fluid is accelerated. On its fluid outlet side, fluid guiding core 430 has a frusto-conical end 431b, the shape and function of which are the same as that of the frusto-conical end 131b of fluid guiding core 130. At the opposite fluid inlet end, fluid guiding core 430 has an end 431a that is designed like end 30b of fluid guiding core 30 shown in FIG. 10 and which is inserted into a fluid connector 24c, which has a receiving side for the fluid guiding core with the same design as that of fluid connector 24a in FIG. 10.

Figure 16:
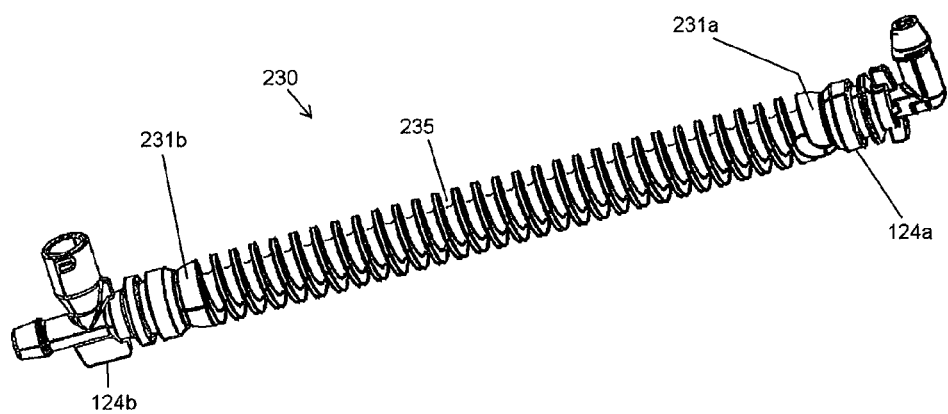

FIG. 16 shows an embodiment of a fluid guiding core 230 with a helical circumferential first fluid channel section 235. The fluid guiding core shown in FIG. 16 is provided at both ends, 231a, 231b with the frusto-conical end and the fluid channel end portion 236, 237 as described above with reference to FIGS. 11 and 12, and has the groove profile described with reference to FIG. 13. In combination with the two fluid connectors 124a, 124b, this embodiment acquires a particularly uniform fluid flow, with special advantages with regard to flow resistance. Fluid connector 124a is configured like fluid connector 124b, but, in the example shown and in contrast to the latter, has an angled connection piece for fluid supply means and does not have a receiving port for a temperature sensor.

Figure 17:
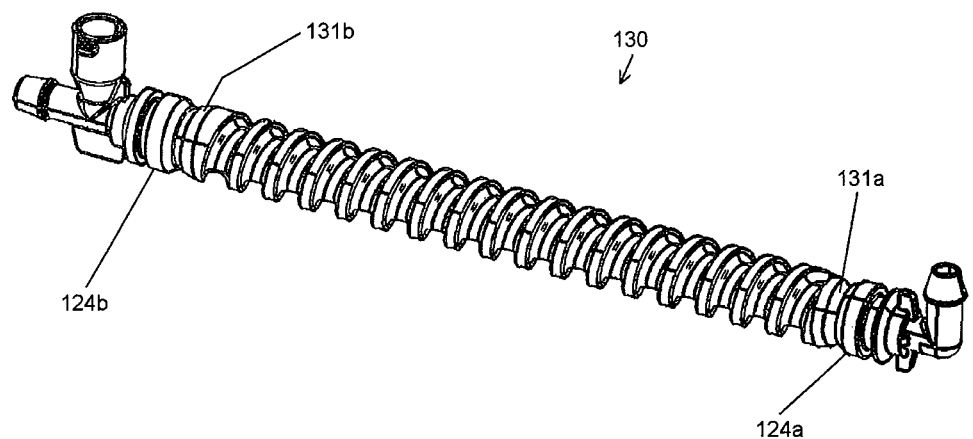

FIG. 17 shows an embodiment similar to that in FIG. 16, but in this case the fluid guiding core 130 with the different groove profile and greater pitch of the helical circumferential first fluid channel section 135 is used, as described above with reference to FIGS. 11 and 12.

Depending on operating conditions, such as the desired values for the parameters pressure, throughflow rate, heating capacity, etc., the design of the fluid guiding core can be varied to a large degree with regard to the cross-sectional profile of the groove and the pitch of the helical circumferential groove, as shown in FIGS. 16 and 17, in order to adjust the hydraulic length of the heated first fluid channel section. It is possible in this way to optimize the dynamic behavior for different operating conditions, and hence the extent to which the fluid heater can be regulated.

Figure 19:
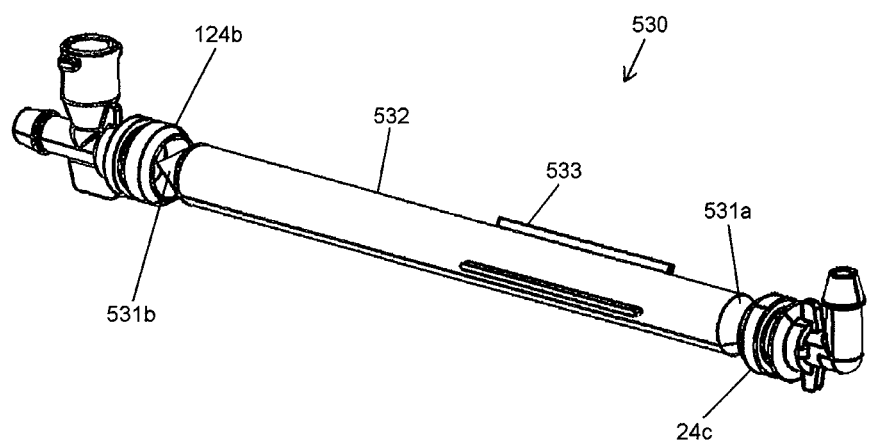

FIG. 19 shows another embodiment, in which the fluid guiding core 530 does not have a helical circumferential fluid channel section. Instead, the fluid channel is in the form of a uniform annular space between a cylindrical portion 532 (core) of fluid guiding core 530 and metal pipe 2, fluid guiding core 530 having spacer ribs 533 arranged on cylindrical portion 532 in order to center and to hold fluid guiding core 530 inside metal pipe 2. Said spacer ribs 533, which may extend over the entire length of the cylindrical portion 532 or only over part thereof in the axial direction, as shown, have the same function as the helix 333 of fluid guiding core 330, but with the difference that the result is not a helical circumferential fluid flow, but a substantially straight fluid flow in the annular space. It is also possible for these spacer ribs to be at a slight angle to the axial direction, such that a helical fluid flow with only few turns ensues, or indeed with only a fraction of a full turn about the central longitudinal axis. A multi-start first fluid channel section then runs side-by-side around the cylindrical portion, the single channels being separated by spacer ribs 533 (multi-start helical structure). On the cold fluid inlet side 531a, fluid guiding core 530 may be attached to a fluid connector 24c which is designed as described with reference to FIG. 15, so that it is fixed in a defined position at a specific distance from fluid connector 124b at the opposite end. It is also possible that the fluid guiding core is simply inserted into metal pipe 2 as far as a defined position, where it is held in place by means of the spacer ribs as a result of a clamping effect. At the fluid outlet end, fluid guiding core 530 has a cone-shaped end 531b which co-operates with fluid connector 124b with a similar design and function as the cone-shaped end 331b of fluid guiding core 330 described further above with reference to FIG. 14. This embodiment likewise produces a particularly gentle and substantially kinkless fluid flow, with the advantages mentioned above. The hydraulic length of a fluid heater which includes such a fluid guiding core 530 is significantly shorter than in the other embodiments, although this may be sufficient under certain operating conditions. The special advantage of this variant of the fluid guiding core is its simple shape, which is particularly simple to produce and which also results in a particularly low flow resistance.

Intermediate forms of a fluid guiding core between the core forms 430 and 530 shown in FIGS. 15 and 19 are possible, with variable pitch or with constant pitch of the helical circumferential fluid channel sections, and with a cone-shaped end 531b or with a frusto-conical end 431b, which have one or a plurality of fluid channel end portions corresponding to fluid channel end portions 136, 137, or with a single-start or multi-start first fluid channel section as described in the previous paragraph.

Whereas the above descriptions, embodiments and attached Figures serve merely to illustrate the inventive devices, other combinations of features and design options are possible which fall within the scope of the present invention as defined solely by the claims herein. In particular, a two-part fluid guiding core is not limited to embodiments in which fluid is supplied and discharged on opposite sides of the metal pipe. Similarly, notch 60 of heat-conducting plate 6c, which is provided on both sides in FIG. 2B, may be provided in other embodiments if need be.

LIST OF REFERENCE SIGNS

1 Fluid heater
2 Metal pipe
3 Opening
4 First end portion
5 Second end portion
6 Heating device
6a, 6b Tubular heating elements
6c Heat conducting means
7a, 7b, 7c, 7d Tubular heating element end(s)
8 Bend
9a, 9b, 9c, 9d Crimping/pinching structure
10a, 10b, 10c, 10d Electrical connection
11 Mounting bracket
12a, 12b Clip(s)
13 Sensor section
13a Downward hook
13b Engagement hook
13c, 13d Catch spring
13e Loop
14a, 14b First/second heat conducting section
15a, 15b First/second connecting section
16 Mounting section
17a, 17b, 17c, 17d Through holes
18a, 18b First/second side portion
19a, 19b Mounting tab(s)
20 Temperature sensor
21 Fastening unit
21a, 21b, 21c, 21d Connection lugs
22 Rivet
23, 23-1, 23-2 Fluid connector assembly
24a; 24c; 124a; 224a First fluid connector
24b; 124b; 224b Second fluid connector
25 Closure member
30; 130; 230; 330; 430; 530 Fluid guiding core
31a, 31b; 131a, 131b; 231a, 321b; 331a, 331b; 431a, 431b; 531a, 531b First/second end of the fluid guiding core
32 First rim
33 Through hole or duct
34 Second fluid channel section
35; 135; 235; 335;435 First fluid channel section
35a; 132; 232 Fluid channel floor
35b; 134; 234 Fluid channel side or side wall
35c; 133; 233 Helical fluid channel rim
36, 36a, 36b First, second and third seal groove
37 Change in depth
38 Fluid channel end
39 Second rim
40 Lock counterpart
41a, 41b, 41c, 41d, 41e Sealing means or O-ring seal
42 Temperature sensor
43-1 Locking groove
43-2 Guide groove for catch
44-1, 44-2 First and second fold
45 Third groove
46 Fourth groove
47 Electrical lead
48a Contact sleeves
48b Plug connector
50 Sealing plug or cap
60 Recess or notch
125; 225 Funnel-shaped opening
126; 226 Fluid connector channel
127; 227 Connection piece for temperature sensor
133, 233 Casing of the fluid guiding core
136, 137; 236, 237 End section of the fluid channel
332; 532 Core of the fluid guiding core
333 Helix
533 Spacer ribs

The invention claimed is:

1. A fluid heater of the continuous flow type, the fluid heater being configured to be used within a household appliance, the fluid heater comprising:
a fluid channel having at least one first fluid channel section,
at least one substantially cylindrical metal pipe,
a heating device having at least one tubular heating element positioned outside the metal pipe, and a heat conducting plate surrounding the metalpipe in a circumferential direction for distributing the heat from the heating device to regions of the metal pipe in contact with the heat conducting plate,
a fluid guiding core which is disposed in the metal pipe and which forms the first fluid channel section between the metal pipe and the fluid guiding core, and
a first fluid connector for fluid supply means and a second fluid connector for fluid discharge means, which are in communication with the respective ends of the fluid channel,
wherein the first fluid channel section runs substantially helically in the form of a groove in an outer surface of the fluid guiding core and the first fluid channel section forms a flow path for the fluid with a hydraulic length, and
wherein the fluid guiding core has a cylindrical core and a helix disposed thereon which forms a first fluid guiding channel section running helically around the fluid guiding core, wherein the core has at least one substantially conical end which partially projects into a substantially funnel-shaped opening of the corresponding fluid connector,
wherein an apex angle of the conical end of the core is selected such that a substantially constant flow cross-section results in the funnel-shaped opening from an orifice to a transition to a fluid connector.

2. The fluid heater according to claim 1,
wherein the cylindrical core of the fluid guiding core is made of plastic.

3. The fluid heater according to claim 2,
wherein the helix of the fluid guiding core is made of plastic.

4. The fluid heater according to claim 3,
wherein the fluid guiding core is a single piece made of plastic.

5. The fluid heater according to claim 2,
wherein the helix of the fluid guiding core is made of metal.

6. The fluid heater according to claim 1 wherein the at least one substantially cylindrical metal pipe has a diameter in a first range from 10 mm to 20 mm and a length in a second range from 120 mm to 220 mm.

7. The fluid heater according to claim 1 wherein the heating device has at least two tubular heating elements spaced apart from each other over equidistant circumferential sections of the metal pipe.

8. The fluid heater according to claim 1 wherein the hydraulic length is twice as long as a length of the metal pipe.

* * * * *